US012406263B2

(12) United States Patent
Dutt et al.

(10) Patent No.: US 12,406,263 B2
(45) Date of Patent: Sep. 2, 2025

(54) FRAUD DETECTION SYSTEM, METHOD, AND DEVICE

(71) Applicant: Zighra Inc., Ottawa (CA)

(72) Inventors: Deepak Chandra Dutt, Ottawa (CA); Xun Yin, Toronto (CA); Zhaoyang Wang, Scarborough (CA); Piotr Konrad Tysowski, Chicago, IL (US); Mohammed Anwarul Hasan, Waterloo (CA)

(73) Assignee: Zighra, Inc., Ottowa (CA)

( * ) Notice: Subject to any disclaimer, the term of this patent is extended or adjusted under 35 U.S.C. 154(b) by 0 days.

(21) Appl. No.: 18/381,946

(22) Filed: Oct. 19, 2023

(65) Prior Publication Data

US 2024/0135383 A1 Apr. 25, 2024
US 2024/0232893 A9 Jul. 11, 2024

Related U.S. Application Data

(63) Continuation of application No. 17/022,867, filed on Sep. 16, 2020, now Pat. No. 11,847,653, which is a
(Continued)

(51) Int. Cl.
*G06Q 20/38* (2012.01)
*G06Q 20/40* (2012.01)
(Continued)

(52) U.S. Cl.
CPC ......... *G06Q 20/4016* (2013.01); *G06Q 50/01* (2013.01); *H04L 63/083* (2013.01)

(58) Field of Classification Search
CPC .. G06Q 20/4016; G06Q 50/01; G06Q 20/386; H04L 63/083
(Continued)

(56) References Cited

U.S. PATENT DOCUMENTS 5,544,321 A 8/1996 Theimer
6,334,121 B1 12/2001 Primeaux
(Continued)

FOREIGN PATENT DOCUMENTS

GB 2419067 4/2006
WO WO 2008/041915 4/2008
(Continued)

OTHER PUBLICATIONS

Rodgers, J.L. Thirteen Ways to Look at the Correlation Coefficient Data. The American Statistician, 41(1) 59, doi: 10.2307/2685263 (1998).
(Continued)

*Primary Examiner* — Clifford B Madamba
(74) *Attorney, Agent, or Firm* — Mahamedi IP Law LLP

(57) ABSTRACT

A system for authentication for a user device associated with a user, said system comprising: a processing system to generate a first user interface running on a screen of said user device, said first user interface comprising one or more components, wherein said one or more components comprises a first icon, which when activated, directs a user to a second user interface to select a secret pattern, a second icon, which when activated, generates a current randomly populated keyboard, further wherein said processing system provides a current Personal Identification Number (PIN) to said user by correlating said secret pattern with the current randomly populated keyboard, and a regular keyboard for said user to enter a PIN for authentication.

26 Claims, 21 Drawing Sheets

Related U.S. Application Data continuation of application No. 14/963,420, filed on Dec. 9, 2015, now abandoned.

(60) Provisional application No. 62/089,615, filed on Dec. 9, 2014.

(51) Int. Cl.
*G06Q 50/00* (2024.01)
*H04L 9/40* (2022.01)

(58) Field of Classification Search
USPC .......................................................... 705/44
See application file for complete search history.

(56) References Cited

U.S. PATENT DOCUMENTS

| | | | |
|---|---|---|---|
| 6,542,729 B1 | 4/2003 | Chmaytelli | |
| 6,810,480 B1 | 10/2004 | Parker | |
| 7,081,905 B1 | 7/2006 | Raghunath | |
| 7,155,417 B1 | 12/2006 | Sagar | |
| 7,162,741 B2 | 1/2007 | Eskin | |
| 7,391,326 B2 | 6/2008 | Puzio | |
| 7,689,524 B2 | 3/2010 | Ozzie | |
| 7,739,951 B2 | 6/2010 | Stab | |
| 7,979,899 B2 | 7/2011 | Guo | |
| 8,020,005 B2 | 9/2011 | Mani | |
| 8,065,277 B1 | 11/2011 | Gardner | |
| 8,145,561 B1 | 3/2012 | Zhu | |
| 8,321,360 B2 | 11/2012 | Lanxner | |
| 8,355,987 B2 | 1/2013 | Hirson | |
| 8,359,278 B2 | 1/2013 | Domenikos | |
| 8,577,803 B2 | 11/2013 | Chatterjee | |
| 8,816,818 B2* | 8/2014 | Yamada ............. | G06V 40/1365 340/5.82 |
| 8,863,307 B2 | 10/2014 | Sorek | |
| 9,066,125 B2 | 6/2015 | Sands | |
| 9,117,068 B1* | 8/2015 | Zhang ..................... | G06F 21/36 |
| 9,264,419 B1 | 2/2016 | Johansson | |
| 9,294,465 B2 | 3/2016 | Gandhi | |
| 9,367,676 B2 | 6/2016 | Wilson | |
| 9,386,507 B1 | 7/2016 | Ramalingam | |
| 9,396,316 B1 | 7/2016 | Altman | |
| 9,471,920 B2* | 10/2016 | Kolkowitz ............. | G06Q 20/40 |
| 9,558,491 B2* | 1/2017 | Edwards ............ | G06Q 20/3226 |
| 9,727,713 B2 | 8/2017 | Agawa | |
| 9,788,203 B2 | 10/2017 | Dutt | |
| 9,871,813 B2 | 1/2018 | Andreeva | |
| 10,187,799 B2 | 1/2019 | Dutt | |
| 10,262,324 B2 | 4/2019 | Turgeman | |
| 10,298,614 B2 | 5/2019 | Turgeman | |
| 10,306,052 B1 | 5/2019 | Lack | |
| 10,404,729 B2 | 9/2019 | Turgeman | |
| 10,588,017 B2 | 3/2020 | Dutt | |
| 10,621,585 B2 | 4/2020 | Turgeman | |
| 10,685,355 B2 | 6/2020 | Novick | |
| 10,747,305 B2 | 8/2020 | Turgeman | |
| 10,834,590 B2 | 11/2020 | Turgeman | |
| 10,949,514 B2 | 3/2021 | Turgeman | |
| 10,949,757 B2 | 3/2021 | Turgeman | |
| 11,223,619 B2 | 1/2022 | Turgeman | |
| 11,269,977 B2 | 3/2022 | Turgeman | |
| 11,272,362 B2 | 3/2022 | Dutt | |
| 2002/0184080 A1 | 12/2002 | Murad | |
| 2003/0110393 A1 | 6/2003 | Brock | |
| 2005/0166065 A1 | 7/2005 | Evtchison | |
| 2006/0165060 A1* | 7/2006 | Dua ..................... | G06Q 20/322 705/76 |
| 2006/0223495 A1 | 10/2006 | Cassett | |
| 2006/0224898 A1 | 10/2006 | Ahmed | |
| 2006/0282660 A1 | 12/2006 | Varghese | |
| 2007/0061590 A1 | 3/2007 | Boye | |
| 2007/0219801 A1 | 9/2007 | Sundaram | |
| 2008/0020733 A1 | 1/2008 | Wassingbo | |
| 2008/0036591 A1 | 2/2008 | Ray | |
| 2008/0092245 A1 | 4/2008 | Alward | |
| 2008/0113650 A1 | 5/2008 | Engstrom | |
| 2008/0114771 A1 | 5/2008 | Welingkar | |
| 2008/0220854 A1 | 9/2008 | Midgley | |
| 2009/0254572 A1 | 10/2009 | Redlich et al. | |
| 2009/0293111 A1 | 11/2009 | Lai | |
| 2009/0313693 A1 | 12/2009 | Rogers | |
| 2009/0327132 A1 | 12/2009 | Diev | |
| 2010/0004997 A1 | 1/2010 | Mehta | |
| 2010/0010907 A1 | 1/2010 | Dasgupta | |
| 2010/0057623 A1 | 3/2010 | Kapur | |
| 2010/0100439 A1 | 4/2010 | Jutla | |
| 2010/0107238 A1 | 4/2010 | Stedman | |
| 2010/0115610 A1 | 5/2010 | Tredoux | |
| 2010/0192209 A1 | 7/2010 | Steeves | |
| 2010/0248706 A1 | 9/2010 | Potkonjak | |
| 2011/0016534 A1 | 1/2011 | Jakobsson | |
| 2011/0148633 A1 | 6/2011 | Kohlenberg et al. | |
| 2011/0202461 A1 | 8/2011 | Lundgren | |
| 2011/0209159 A1 | 8/2011 | Baratz et al. | |
| 2011/0225644 A1 | 9/2011 | Pullikottil | |
| 2012/0149449 A1 | 6/2012 | Choi | |
| 2012/0196568 A1 | 8/2012 | Baksi l | |
| 2012/0203663 A1 | 8/2012 | Sinclair | |
| 2012/0233658 A1 | 9/2012 | Piersol | |
| 2012/0235938 A1 | 9/2012 | Laughbach | |
| 2012/0239479 A1 | 9/2012 | Amaro | |
| 2012/0253957 A1 | 10/2012 | Bakshi | |
| 2012/0278094 A1 | 11/2012 | Kovacevic | |
| 2012/0300938 A1 | 11/2012 | Kean | |
| 2012/0323717 A1 | 12/2012 | Kirsch | |
| 2013/0030875 A1 | 1/2013 | Lee | |
| 2013/0042327 A1 | 2/2013 | Chow | |
| 2013/0061285 A1 | 3/2013 | Donfried et al. | |
| 2013/0073463 A1 | 3/2013 | Dimmick | |
| 2013/0081119 A1 | 3/2013 | Sampas | |
| 2013/0097683 A1 | 4/2013 | Davis | |
| 2013/0102283 A1 | 4/2013 | Lau | |
| 2013/0104187 A1 | 4/2013 | Weidner | |
| 2013/0110658 A1 | 5/2013 | Lyman | |
| 2013/0133033 A1 | 5/2013 | Davis | |
| 2013/0160087 A1 | 6/2013 | Davis | |
| 2013/0181949 A1 | 7/2013 | Setlak | |
| 2013/0191908 A1 | 7/2013 | Klein | |
| 2013/0205387 A1 | 8/2013 | Le et al. | |
| 2013/0227651 A1 | 8/2013 | Schultz | |
| 2013/0232159 A1 | 9/2013 | Daya | |
| 2013/0239206 A1 | 9/2013 | Draluk | |
| 2013/0257804 A1 | 10/2013 | Vu | |
| 2013/0275355 A1 | 10/2013 | Miltonberger | |
| 2013/0276118 A1 | 10/2013 | Kashyap | |
| 2013/0344859 A1 | 12/2013 | Abramson | |
| 2013/0347066 A1 | 12/2013 | Wells | |
| 2014/0037243 A1 | 2/2014 | Lee et al. | |
| 2014/0068778 A1 | 3/2014 | Bhatia | |
| 2014/0092052 A1 | 4/2014 | Grunthaner | |
| 2014/0201120 A1 | 7/2014 | Lydon | |
| 2014/0289867 A1 | 9/2014 | Bukai | |
| 2014/0337943 A1 | 11/2014 | Dutt | |
| 2014/0337945 A1 | 11/2014 | Jia et al. | |
| 2016/0259924 A1 | 9/2016 | Dutt | |
| 2017/0163471 A1 | 6/2017 | Zheng | |

FOREIGN PATENT DOCUMENTS

| | | |
|---|---|---|
| WO | WO 2011/006381 | 6/2011 |
| WO | WO 2013/155628 | 10/2013 |

OTHER PUBLICATIONS

ISR and Written Opinion in PCT/IB2014/063959 dated Dec. 8, 2014.

Wang, Analysis of human electrocardiogram for biometric recognition, EURASIP Journal on Advances in Signal Processing, 2008:19, 2008.

Behavio Gesture Lock https:// play.google.com/store/apps/details/ Aug. 19, 2013.

(56) References Cited

OTHER PUBLICATIONS

Li, Yiru "Securing email archives through user modeling", Computer Security Applications Conference, 21st Annual, IEEE, 2005.
Li, Yiru, "Toward Email Archive Intrusion Detection", Master of Computer Science dissertation, Carleton University, 2005.
Thorpe, Pass-thoughts: authenticating with our minds, Proceedings of the 2005 workshop of new security paradigms (NSPW '05), ACM, New York 2005.
Zakaria, Shoulder surfing defence for recall-based graphical passwords, Proceedings of the Seventh Symposium on Unsable Privacy and Security, p. 6, ACM, 2011.
Furnell, Beyond the Pin: Enhancing user authentication for mobile devices, Computer Fraud & Security, Aug. 2008, pp. 12-17, vol. 2008, Issue 8, Elsevier, Plymouth, UK.
Furnell, Authentication of users on mobile telephones—A survey of attitudes and practices, Computers & Security, Oct. 2005, pp. 519-527, vol. 24, Issue 7, Elsevier, Perth, Australia.
Feng, Continuous mobile authentication using touchscreen gestures, Homeland Security (HST), 2012 IEEE, Conference on Technologies, Nov. 2012, pp. 451-456, IEEE.
Frank, Touchalytics: On the Applicability of Touchscreen Input as a Behavioral Biometric for Continuous Authentication, Jan. 2013, pp. 136.
Lin, A New Non-Intrusive Authentication Method based on the orientation sensor for Smartphone users, IEEE Sixth International Conference oon Software Security and Reliability (SERE), Aug. 2012, pp. 245-252, IEEE.
Derawi, Unobtrusive User Authentication on Mobile Phones Using Biometric Gait Recognition, Intelligent Information Hiding and Multimedia Signal Processing (IIH-MSP), 2010 Sixth International Conference, Oct. 2010, IEEE.
Palaniappan, Biometrics from Brain Electrical Activity: A machine learning Approach, IEEE Transaction on Pattern Analysis and Machine Intelligence, Apr. 2007, pp. 738-742, vol. 29, No. 4, IEEE Computer Society.
Monrose, Keystroke dynamics as a biometric for authentication, Future Generation Computer Systems, Feb. 2000, pp. 351-359, vol. 16, Issue 4, Elsevier, New York, NY, USA.
Zhao, Face recognition: A literature survey, Computing Surveys (CSUR), Dec. 2003, pp. 399-458, vol. 35 Issue 4, ACM, New York, NY, USA.
Plamondon, Online and off-line handwriting recognition: a comprehensive survey, Pattern Analysis and Machine Intelligence, Jan. 2000, pp. 63-84, vol. 22, Issue: 1, IEEE.
Jakobsson, Implicit Authentication for Mobile Devices, Proceedings of the 4th USENIX conference on Hot topics in security, 2009, pp. 9-9, USENIX Association.
Shi, Implicit Authentication through Learning User 15 Behavior, Information Security, 2011, pp. 99-113, vol. 6531, Springer.
Riva, Progressive Authentication Deciding When to Authenticate on Mobile Phones, 21st USENIX Security Symposium, 2012, USENIX.
Shi, W., Sengard: Passive user identification on smartphones using multiple sensors, 2011 IEEE 7th International Conference on Wireless and Mobile Computing, Networking and Communications (WiMob), 2011, pp. 141-148, IEEE.
Bo, SilentSense: silent user identification via touch and movement behavioral biometrics, 19th annual international conference on Mobile computing & networking, 2013, pp. 187-190, ACM, New York, NY, USA.
Clarke, Authenticating mobile phone users using keystroke analysis, International Journal of Information Security, Jan. 2007, pp. 1-14, vol. 6, Issue 1, Springer.
Li, Securing email archives through user modeling, Computer Security Applications Conference, 21 Annual, 2005, IEEE.
Li, Toward Email Archive Intrusion Detection, 2005, Master of Computer Science dissertation, Carleton University.
White-paper—BehavioMobile: Applying the behaviosec technology for multilayered mobile security, retrieved from http://behaviosec.com/ wp-content/uploads/2012/10/ whitepaper-behaviomobile.pdf, 2012, BehavioSec.
Hirishima, SkipLock, retrieved from http://benhirashima.com/skiplock/, Dec. 7, 2016 www.benhirashima.com.
Rice, Android Jelly Bean's Face Unlock "Liveness Check" Circumvented With Simple Photo Editing, retrieved from http://www.androidpolice.com/2012/08/03/android-jelly-beans-face-unlock-liveness-check-circumvented-with-simple-photo-editing/, Android Police.
Etherington, Apple Patents IR Tech for Detecting the Force of Touch Input on iPads and iPhones, https://techcrunch.com/2014/04/03/apple-patents-ir-tech-for-detecting-the-force-of-touch-input-on-ipads-and-iphones/ retrieved on Dec. 7, 2016, TechCrunch.
White paper: Third Party Verification of Eyeprint Accuracy, Eyeverify, www.eyeverify.com, Apr. 2013, EyeVerify.
Samsung Galaxy S-5, Capturing Lifetime Moments, www.samsung.com, Jun. 2014, Samsung.
Android 4.0 (Ice Cream Sandwich), www.android.com, Jun. 2014, Android.
Behavio Gesture Lock User Guide dated Sep. 7, 2011, pp. 1-11, BehavioMetrics AB.
Behavio Gesture Lock 3.O.8., 2012, http://learn-the-figures.android.informer.com/3.0.8/, 2012.

\* cited by examiner

FRAUD DETECTION SYSTEM, METHOD, AND DEVICE

CROSS-REFERENCE TO RELATED APPLICATIONS

This application is a continuation of U.S. patent application Ser. No. 17/022,867 filed Sep. 16, 2020; which is a continuation of U.S. patent application Ser. No. 14/963,420, filed Dec. 9, 2015; which claims priority to U.S. Provisional Application No. 62/089,615 filed Dec. 9, 2014: the aforementioned applications being hereby fully incorporated by reference in their entireties

FIELD OF THE INVENTION

The present disclosure relates to a system, method and device for fraud detection in transactions over communications networks.

BACKGROUND

Credit card fraud costs banks time, money and has become an increased problem with cyber-crime, phishing schemes, and other programs designed to take advantage of fraudulent credit cards or means for payment.

Additionally, due to the scale of card fraud, issuing banks tend to implement quite aggressive strategies in order to combat the problem. This, however, leads to high false positive rates that cause extreme inconveniences to cardholders and merchants resulting in high operational costs (including resolution management) to the issuer. As an additional consequence, high volumes of false positives may also prevent the issuer from declining further transactions, leading to additional losses.

Existing risk-engine strategies do not have the benefit of information on user generated information (including online complaints regarding merchants, hidden charges, billing errors) and the real-time status of the cardholder, they are not well suited to cross-border transactions where behavioral and historical patterns do not fit the norm.

Moreover, without verification in real time at the point of sale between the various players in the ecosystem (e.g., banks, card companies, merchants, consumers), real-time fraud detection/prevention has been challenging, to enable effectively.

Therefore, there is a need for a new solution whereby all parties to the financial ecosystem may benefit from user generated information and real time verification.

BRIEF SUMMARY

A first major embodiment of the invention includes a method of authenticating a transaction. Responsive to receiving a request for authenticating a transaction, a first device includes a first device information that defines a first device characteristic of the first device. A second device information is obtained defining a second device characteristic of a second device associated with the transaction. A level of correlation between the first device information and the second device information is determined and the transaction is authenticated based on the level of correlation between the first device information and the second device information. Where the transaction is authenticated when the level of correlation between the first device information and the second device information is above a pre-determined threshold.

In other embodiments of the invention the level of correlation between the first device information and the second device information comprises first obtaining a dynamic weighting factor corresponding to the first device characteristic and the second device characteristic. Then applying the dynamic weighting factor to the first device information and the second device information. Finally, generating a sum correlation total, where the sum correction total comprises the calculation of dynamic weighting factors to each of the first device information and the second device information.

In some embodiments of the invention, the first device and the second device are the same device.

In further embodiments of the invention, the method further comprises establishing a call between a third party and an entity in response to a determination that the level of correlation between the first device information and the second device information is below a pre-determined threshold for authentication. The entity is associated with at least one of the first device and the second device.

In other embodiments of the invention, the method further comprises prompting for the input of a PIN at the first device, the PIN and the context in which the PIN is input being recorded. In other embodiments, the method further comprises prompting of the input of a password at the first device, the password and the context in which the password is input being recorded. In further embodiments, the method further comprises prompting of the input of biometric data at the first device, the biometric data and the context in which the biometric data is input being recorded.

A second major embodiment of the invention includes a method of authenticating a transaction. The method comprises a first device receiving a request for authenticating a transaction involving the first device and including a first device information defining a first device characteristic of the first device. A second information is obtained defining a second characteristic of the transaction. The second information is independent of the first device. A level of correlation between the first device information and the second device information is determined. The transaction is authenticated based on the level of correlation between the first device information and the second information. The transaction is authenticated when the level of correlation between the first device information and the second information is above a predetermined threshold.

In some embodiments of the invention the second information comprises crowdsourcing data. The crowdsourcing data comprises a plurality of users[5] feedback where the plurality of users[5] are not involved with the transaction. In some embodiments the method further comprises using the crowdsourcing data to generate a risk level weighted by the time and age of the crowdsourcing data. In other embodiments the second information is related to the location of the transaction.

A third fundamental embodiment of the invention includes method of fraudulence verification of a transaction being conducted over a communications network. The method comprises comparing the transaction information with database information stored in a database to determine whether a transaction is potentially fraudulent. The database information comprising crowdsourcing data and the crowdsourcing data comprising a plurality of users[5] feedback where the plurality of users[5] not involved with the transaction. A request is sent to a second device associated with the transaction requesting confirmation information on whether the transaction is fraudulent. The transaction is authenticated using the confirmation information responsive to receiving a response with the confirmation information.

In other embodiments of the invention upon receiving the response with the user credentials and the confirmation information, the transaction is authenticated by determining whether the user credentials allow access to the transaction and using the confirmation information only if the user credentials allow access to the transaction. In some embodiments, database information comprises authentication history of an entity associated with at least the one of the first device and the second device. In further embodiments of the invention, notifications are sent to the first device when a number of invalid transactions recorded in the authentication history of an entity associated with the second device reaches a pre-determined threshold. In other embodiments, notifications are sent to the second device when a number of invalid transactions recorded in the authentication history of an entity associated with the first device reaches a pre-determined threshold. In yet more embodiments, the database information comprises crowdsourcing data where the crowdsourcing data comprising a plurality of users[5] feedback, the plurality of users[5] not involved with the transaction.

BRIEF DESCRIPTION OF THE DRAWINGS

FIG. 3CA shows a screen for random PIN entry.

FIG. 3CB shows a screen for a user to select some empty cells in a grid.

FIG. 3I shows an example flowchart for the combination of obfuscation with the random PIN entry process.

Figure 1:
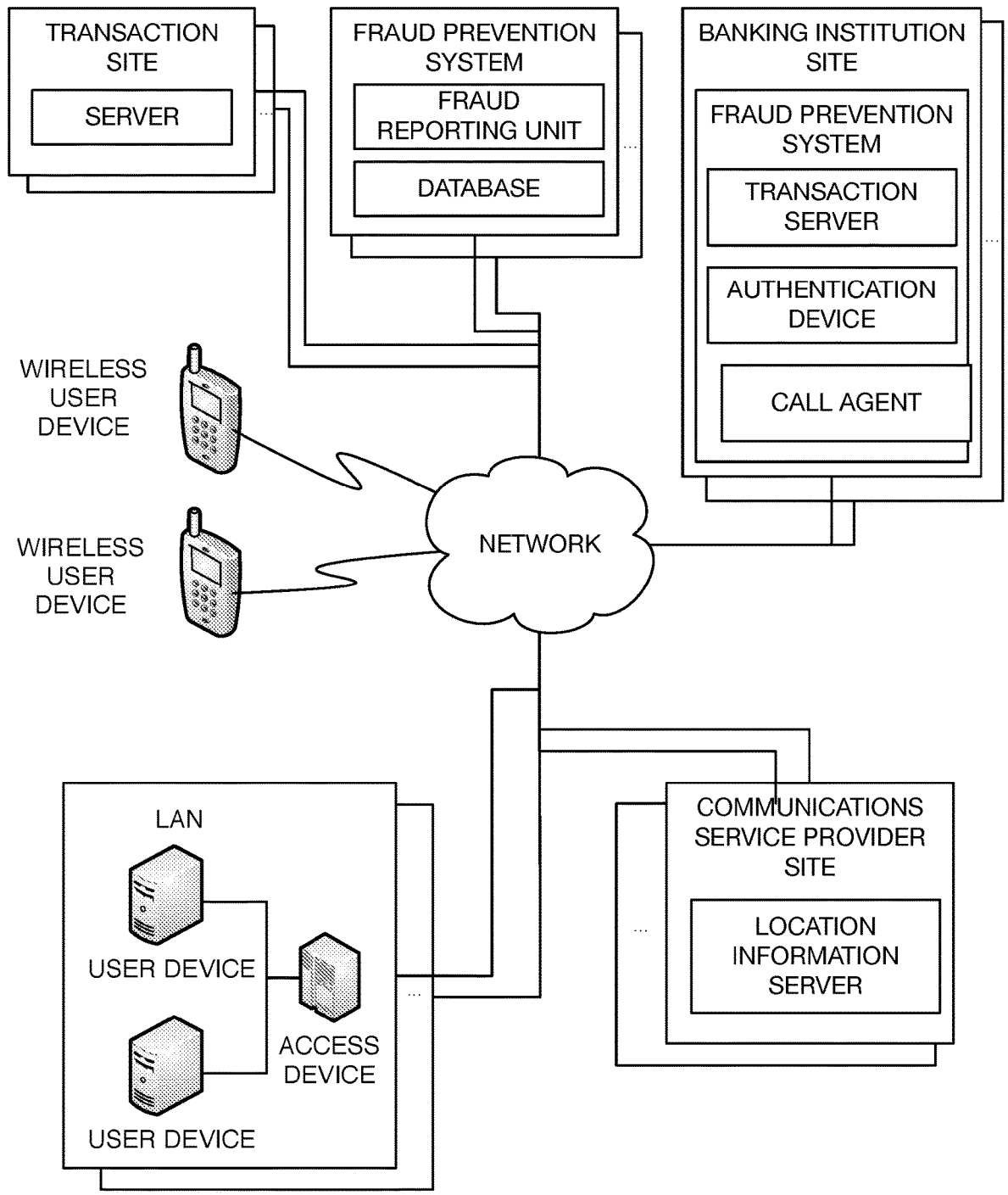
FIG. 1 illustrates a network communications system in which implemented is a fraud prevention system for transactions, in accordance with an embodiment.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

Unless defined otherwise, all technical and scientific terms used herein have the same meaning as commonly understood by one of ordinary skill in the art to which this invention belongs.

The present invention provides a fraud detection and resolution management system, method, system, and device which analyze a variety of dynamic characteristics to authorize financial transactions.

System Overview

For illustrative purposes FIG. 1 shows an example of a networked fraud prevention system for transactions in accordance with an embodiment of the invention. The network communications system may include communications service provider sites, banking institution sites, fraud reporting centers, LANs (Local Area Networks), transaction sites, and wireless user devices coupled to a network.

More generally, the network communications system has a number of locations including communications service provider sites, banking institution sites, fraud reporting centers, and transaction sites. The various sites are connected by communications networks such as LANs. The system may be accessed through wireless or wired user devices. In some implementations, one or more of the banking institution sites includes a fraud reporting center. Each banking institution site includes a fraud prevention system having a transaction server, an authentication device and a call agent. Each fraud reporting center includes a database and a fraud reporting unit. Each LAN includes a plurality of user device and an access point. Each communications service provider site has a location information server. Each transaction site includes a server. The network allows communications between the wireless user devices, the transaction servers, the authentication devices, and the call agents at the fraud prevention systems, the location information servers at the communications service provider sites, the user devices and LAN access points, the servers at the transaction sites, and the fraud reporting units of the fraud detection centers to allow them to communicate with each other through wired and wireless communication networks. The network can take the form of a combination of one or more cellular networks, wired telephony networks, and the Internet.

User Devices and User Specific Information

User devices are used to perform transactions such as online banking transactions, credit card and debit card, ATM, PoS (Point-of-Sale), eCommerce, and remote access transactions. Such transactions are carried out by the servers at the transaction sites. More generally, the transactions include transactions requiring security such as transactions for commerce and payments.

A user device may be any device capable of network access and may use any combination of wired and wireless interfaces. In some embodiments, the device may include a personal computer, tablet, mobile device, mobile phone, television, music player, personal organizer, or any similar electronic network enabled device. In some embodiments, the user device may be wearable technology including, but not limited to, jewelry (e.g., earrings, bracelets, bands, necklaces), piercings (e.g., subcutaneous or not, in essentially any part of the body), watches, glasses, hats, clothing (e.g., male and female underwear, pants, dresses, shirts, sweater, jacket), shoes, socks—essentially anything that is placed on or in a person can potentially include electronics and network enablement. In some embodiments, the user device may include an interface for accepting credit card payment or debit payments at a business.

A user using a user device may initiate a transaction, and the transaction is initiated through one of the fraud prevention systems. More particularly, the fraud prevention system makes use of user specific information. User specific information includes an identifiable characteristic of the user. User specific information includes, but is not limited to, location of the user relative to the server (e.g., the GPS on mobile devices may be utilized to extract location data), user behavioral analytics of mobile device (e.g., keystroke frequency, application tendency, call history), biometric analytics (e.g., voice verification, fingerprint verification, retina verification), device contextual checks, network intelligence (e.g., detection of call forwarding, phone type, post-paid/pre-paid, landline, VOIP, spoofing, SIM swaps, VPN, proxy), and information extracted from crowdsourced information (e.g., scouring social media feeds such as Foursquare® or Twitter® to search for locational information or general commentary, complaints, peer-to-peer interactions).

With respect to the location user specific information, a user's location may be extracted from user's mobile GPS, user's IP address, carrier API, cellular triangulations, social network data mining, CCTV surveillance, satellite monitoring, among other location based identifiers.

Each of the previously mentioned characteristics may be used in any combination thereof to combine information in order to generate a higher probability of confirming the identity of the user at the point of transaction. For example, location based information may be used with behavioral monitoring to raise a flag that user has not been in a certain store for the last 12 months yet wishes to purchase from this specific location. These characteristics are used at the authentication stage in a process utilizing dynamic weights assigned to each of the user specific characteristics to determine whether the sum weighted score meets the threshold required in order to achieve valid authentication and process the financial transaction.

In some embodiments, location analysis may be multi-faceted and implemented by retrieving a multiple of locations relevant to the transaction. This may be the location of the transaction (e.g., merchant), the location of the user's mobile, the location of a user's tweets (via Twitter® API), the location of a user's Facebook® status update, the location of a user's Foursquare® checkin, the location of a user on CCTV and other real-time public databases, as well as other location sources from mining the web and social media sites. Location data may also be qualified or weighted based on the time or age of the location data. These different characteristics are combined and put into the dynamic weighting analysis stage where a dynamic weighting factor is assigned to each user specific characteristic. The dynamic weighing is received from a dynamic database assigning values for each factor. It should be noted that the weights may change depending on the user information received from the user.

In some embodiments, the same or different user specific information may be collected from multiple user devices. Depending on the individual devices, each may communicate using different networks and protocols and therefore, location information may come from different communications service providers that provides communication capabilities to the user devices. Authentication of a transaction may rely on correlating between the location of the devices to validate the transaction. In some embodiments, transactions are carried out via the server at one of the transaction sites. Furthermore, in some implementations, the user device is located at the transaction site as the case may be in an ATM or credit/debit card payment system.

In some embodiments, different information can be collected from the same device. Particularly, the means for payment and the mobile device may be one in the same. In some embodiments, a mobile device may be configured with credit card authorization. This may be accomplished by any means including "mobile wallet" technology where a mobile device has one or more payments means (including credit cards embedded) which is utilized with the first device location. In some embodiments, applications and operations performed using Near-Field Communication (NFC) may be considered as having the first device and second device in the same device. In some embodiments, the first device and second device may interface to the system using mobile browsers operated from the mobile device of the user. In some embodiments, it is contemplated that SIM based credit may be used on a user's mobile device for transactions. In some embodiments, it is contemplated that Peer-to-Peer transactions may be enabled over the user's device.

In other implementations the first and second devices are different devices. As mentioned previously, this is where the authenticating device and the user device exist in two discrete devices, for example a merchant credit card module and a user's mobile phone, or a retina scanner and a user's eye.

Authentication

Authentication is where all the user specific information is evaluated to determine whether further verification is required, or the transaction may proceed to processing. Authentication may vary depending on application in terms of complexity and the number of factors taken into consideration.

Authentication may be provided such that the characteristics used for verification may be implemented in an authentication stage of the transaction in order to produce a higher degree of security taking into account more information. Additional characteristics may require additional verification if the initial characteristics does not meet the specified threshold.

Figure 2:
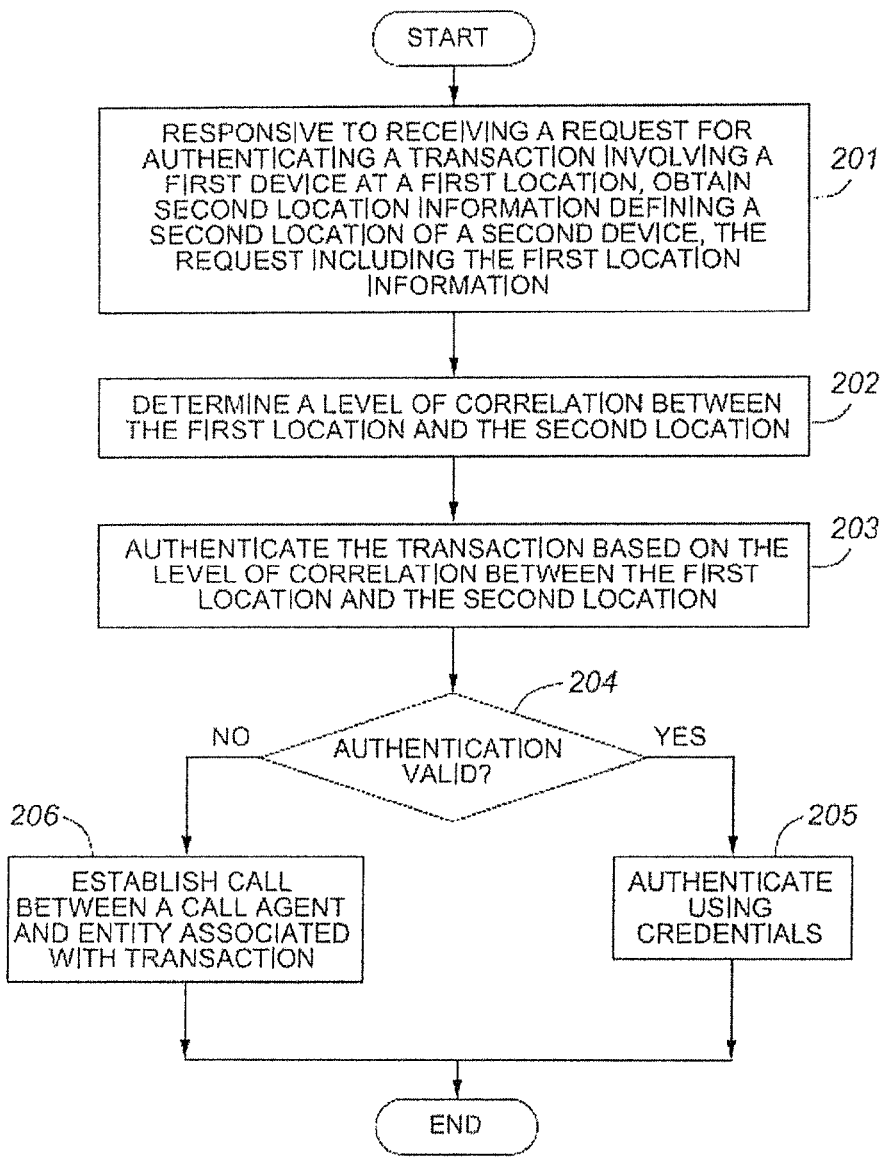
FIG. 2 is flow chart of one example of a method of authenticating a transaction in the fraud prevention system based on location criteria.

In some embodiments, location may be used as the sole initial characteristic required for authentication. FIG. 2, shows a flow chart of a method of authenticating a transaction in the fraud prevention system of FIG. 1. In some embodiments, the method is implemented by the authentication device at any one of the banking institution sites. At step 201, in response to receiving a request for authenticating a transaction involving a first device at a first location, secondary information related to the location of a second device associated with the transaction is required and obtained. The request includes the first location information, and at step 202 a level of correlation between the first location and the second location is determined. The location information may include an IP address, latitude and longitude coordinates or a postal or ZIP code. At step 203, the transaction is authenticated based on the level of correlation between the first location and the second location. The correlation must be within a defined threshold. This may be representative of the accurate distance between a mobile phone and a credit card. This threshold will vary depending on application.

If the authentication is valid at step 204, the authentication is continued at step 205 by requesting credentials from the user and processing the transaction downstream. If the user device is a mobile phone step 205 may involve a call to the user device requesting user identification information and a PIN (Personal Identification Number), password, or unconstrained finger swipe. If the user device is a debit/credit card device at a merchant for example, the credentials can include user and account information together with an unconstrained finger swipe, PIN, or password to allow the transaction or to block it, or to flag it for further review.

The user may be given the option to explicitly allow, block, or flag a transaction and this becomes a type of two-factor authorization. Allowing the transaction will allow the transaction to complete. Blocking the transaction cancels it and the transaction may be repeated to completed by other means. Flagging the transaction may indicate that the user is unsure, concerned, or unhappy with some aspect of the transaction. When this type of information is associated with a location, a merchant, or an online store it can be collected from a number of users and form the basis of a crowd-sourced, peer-to-peer database that can be used to evaluate the risk of fraudulent or potentially fraudulent transactions associated with the location. Here the term location is meant to include any entity that is interacting with the user to provide the transaction. This may be a location such as a particular store, a merchant, a payment processor, or an online store.

The request received at step 201 may include a phone number or a unique identifier of an entity corresponding to the user device or other device, such as a mobile phone or home phone, or an identifier of the user. If the authentication fails at step 204, in one embodiment, at step 206 a call between the call agent and the entity is established using the phone number or secure 2-way messaging. In some implementations, at step 206 the authentication device sends a call request to the call agent and the call agent sets up a call with the user device or other user device for further verification. The verification can use rich push notifications, an automated phone, two-way SMS (Short Message Service) messaging, voice biometric requests, or mobile phone based "Secure Elements[5], such as SIM (Subscriber Identity Module) cards, SD (Storage Device) cards, or chip based cards for example.

With reference to FIG. 1 and FIG. 2, at step 201 the second location includes information obtained from the location information server at a respective one of the communications service provider sites responsible for providing communications to the second device requesting the transaction. Alternatively, in other implementations, user devices periodically register their positions and/or changes therein with respective fraud prevention systems, and location information is obtained by retrieving relevant information from the databases at the fraud prevention systems.

In some embodiments, the authentication involves having the authentication device send information to the user device confirming the authentication. In some embodiments, GPS on the user device may provide location based information constantly, or at a specified interval. In some embodiments, retina scanners implementing biometrics at a location may scan the user's physical eye to authenticate identity and associate a user with a location. In some embodiments, the user device is measured relative to other device in close proximity, whether the other device is the authentication device or a third party device interacting with the system.

In some embodiments, the request received at step 201 includes one or more first characteristics associated with the user device other than the second location information.

Multi-characteristic Authentication

Authentication may comprise the analysis of multiple characteristics to verify the identity of the individual and enable fraud detection. Each of the characteristics has a dynamic weighting such, based on circumstance such that the weighting may change in the calculation with respect to pre-defined rules. Therefore, one characteristic may have a high weighting (e.g., location obtained from IP), however, if this characteristic is in disagreement with other characteristics which are analyzed, the threshold level required for passing valid authentication may not be allowed without further scrutiny in the verification stage.

As mentioned previously, these additional characteristics include the velocity of the user device, a characteristic of environment in which the user device is in, the gait of the user, the keying speed of keys being typed in the user device, biometrics, behavioral analytics, for example. In such embodiments, at step 201 for each first characteristic a respective second characteristic associated with the user device is obtained. At step 202 for each first characteristic a respective level of correlation between the first characteristic and the respective second characteristic is determined. At step 203 the transaction is authenticated based on the respective level of correlation between each of the first characteristic and the respective second characteristic. More specifically, in some implementations the authentication fails if any one or more correlation is below a respective threshold value. However, it is to be clearly understood that other implementations are possible. For example, in some implementations the authentication fails if any N or more correlations are below respective threshold values, where N is an integer with N>1. In other implementations the authentication fails if any M or more correlations are below respective threshold values, where M is an integer with M>2, or if anyone or more of a subset of the correlations are below respective threshold values. It is contemplated that further subsequent characteristics may be implemented in the comparison analysis, and analysis is not limited to two characteristics.

With respect to dynamic weighing, the general operations are implemented as follows. A pre-set weighting is given to each characteristic in a database. Said database is utilized for each authentication where unless a set of programmed weighted factors are assigned to each user specific characteristic are applied into the database. For example, if location by GPS specifies a certain address, however the location via IP specifies a different address, the location authentication may reduce in weighing as different sources are in disagreement. However, if there is an additional verification for location using fingerprint scanning at a credit card terminal, this may be enough to outweigh the previous ambiguity of location based on IP and GPS. This set of exhaustive combinations is held within a data-base and the rules of such may be adjusted as required.

In some implementations, some transactions do not need authentication using credentials and step 205 is not required for authentication for such transactions.

Authentication and Communication Interface

Further details of the structure and operation of the authentication device and the user device will now be described with reference to FIG. 3A and FIG. 3B.

Figure 3A:
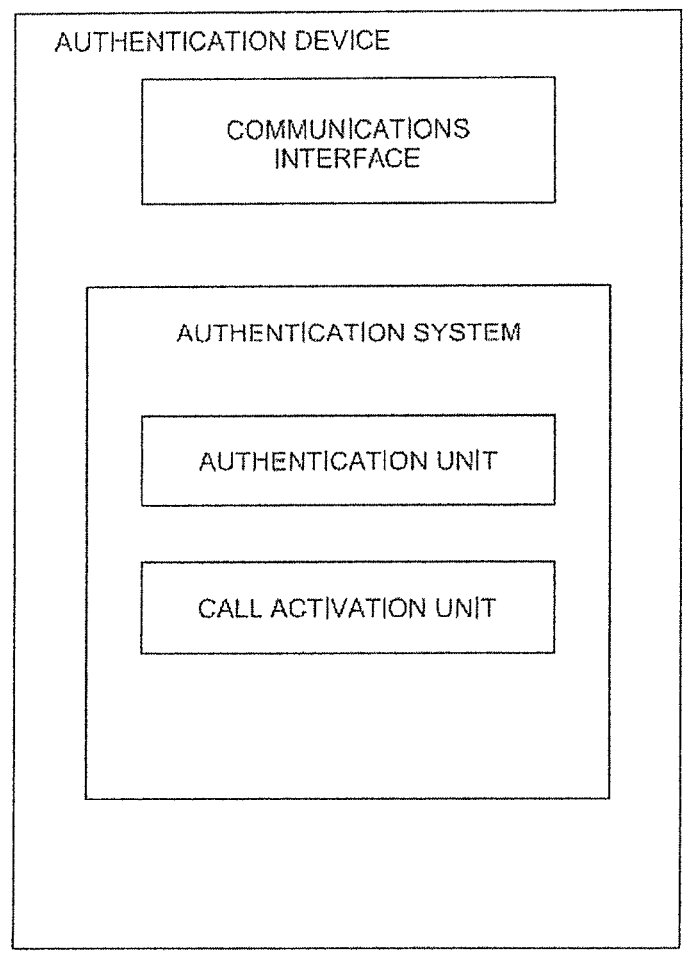
FIG. 3A is a block diagram of an example of one variety of an authentication device.

A block diagram of an example of the implementation of the authentication device of FIG. 1 is shown in FIG. 3A. The authentication device has a communications interface and an authentication system having an authentication unit and a call activation authentication unit. The communications interface provides the authentication device with the capability of communicating with other devices for purposes of receiving requests for authenticating transactions, obtaining location information from location information servers, confirming authentication, and requesting calls through a third party, such as a call agent, for verification. For each request received, the authentication unit obtains second location information defining a second location of another user device associated with the transaction. The authentication unit also determines a level of correlation between the first location and the second location and authenticates the transaction based on the level of correlation between the first location and the second location. When authentication fails the authentication unit makes a request to the call activation unit for a call to be established between the third party (e.g., call agent) and the first or second device so that failure of authentication can be reported and to resolve the problem.

In FIG. 3A, the functionality of each of the communications interface and the authentication system and its authentication unit and call activation unit can be implemented using any suitable combination of software, hardware, and firmware.

Figure 3B:
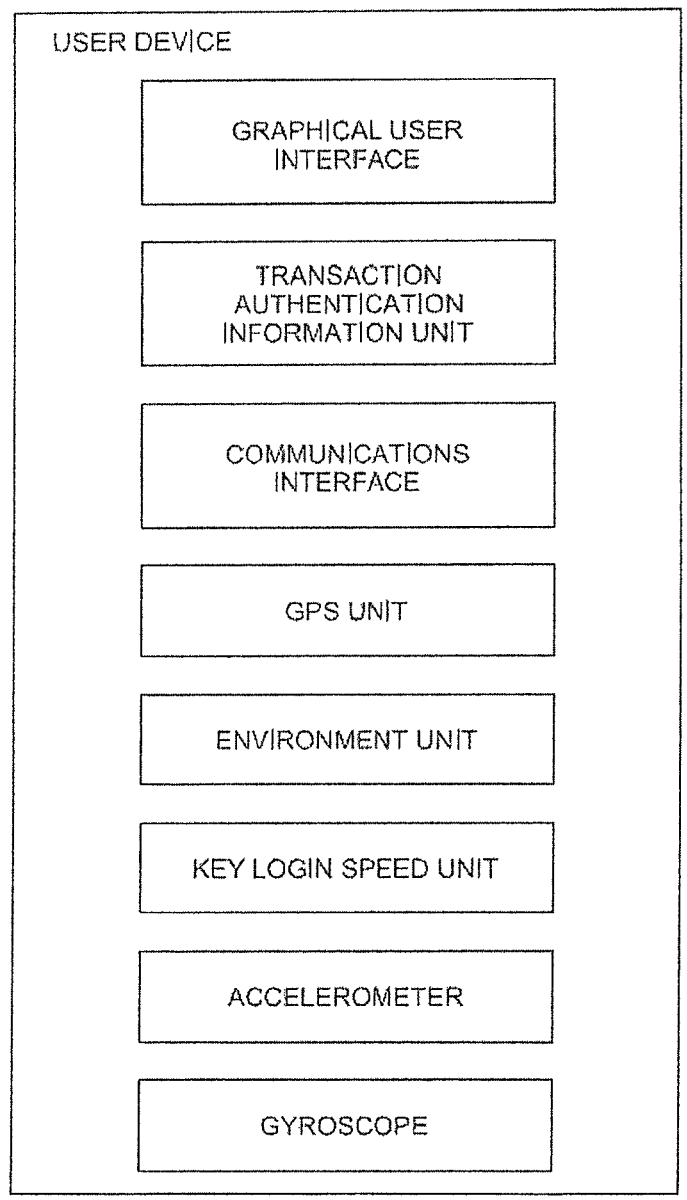
FIG. 3B is block diagram of an example of one variety of a user device.

FIG. 3B, shows a block diagram of a representative user device or wireless user device from FIG. 1. The user device has a number of features well suited for use in a wireless user device such as a mobile phone for example, and it is to be clearly understood that some of the features described below are optional. The user device has a graphical user interface, a transaction authentication information unit, a communication interface, a GPS (Global Positioning System) unit, an environment unit, a key login speed unit, a gyroscope, and an accelerometer. The user interface provides the user with the ability to enter and view information and includes a keyboard and display for example.

The communications interface allows the user device to communicate with other devices and servers in a network communications system. In some embodiments, the GPS unit provides position and velocity information for use in the authentication process. The environment unit may provide information on environmental conditions such as temperature and wind speed and/or velocity, for example. The key login speed unit monitors the speed at which login information is keyed in. The transaction authentication unit communicates with the GPS unit to receive location and/or speed information on the user device. The transaction authentication unit communicates with the environment unit to receive information on environmental conditions at the location of the user device. In addition, the transaction authentication unit communicates with the key login speed unit to receive information on the speed of key logins in order to differentiate between manual and automated logins. The transaction authentication unit communicates with the gyroscope and the accelerometer to receive information for determining gaiting of the user and acceleration of the user/device. The transaction authentication unit also communicates with the graphical user interface to provide a GUI (Graphical User Interface) for displaying information relevant to the authentication process and for user input of information required for input by the user.

In FIG. 3B, the functionality of each of the graphical user interface, the transaction authentication unit, the communications interface, the GPS unit, the environment unit and the key login speed unit can be implemented using any suitable combination of suitable software, hardware, and firmware.

Random PIN Entry and Obfuscation Feature

Explicit authentication schemes for mobile devices which employ identifiers such as Personal Identification Numbers (PINs) or passwords, have several problems. An attacker/impostor can "shoulder surf; that is, observe the credential being inputted over the shoulder of the user without the knowledge of the user, and be able to replicate it perfectly. Though shoulder surfing mitigation techniques exist these mitigation techniques typically gain this increase in security by compromising usability. Attackers or impostors can also observe smudge patterns on a screen of a device and use these to replicate identifiers.

Systems and methods are described below to overcome the challenges posed by shoulder surfing to explicit authentication schemes.

Figure 3C:
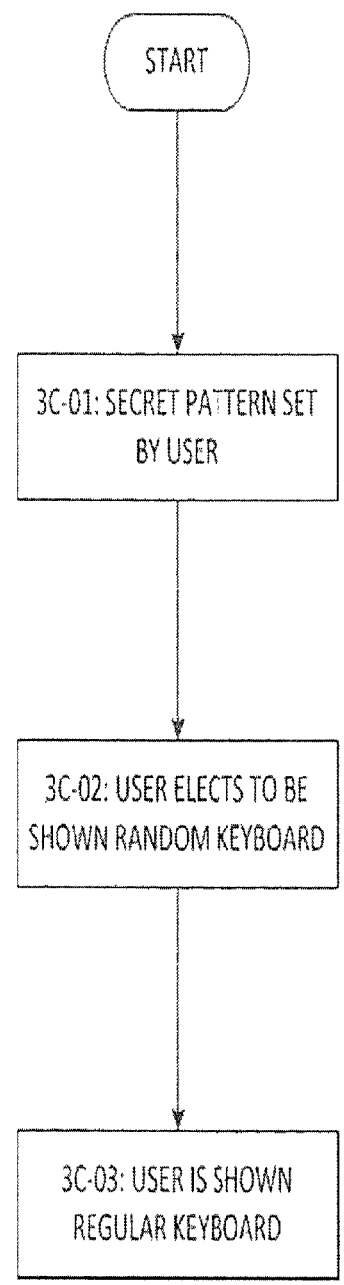
FIG. 3C shows a flowchart of an embodiment for random PIN entry.
Figure 3C:
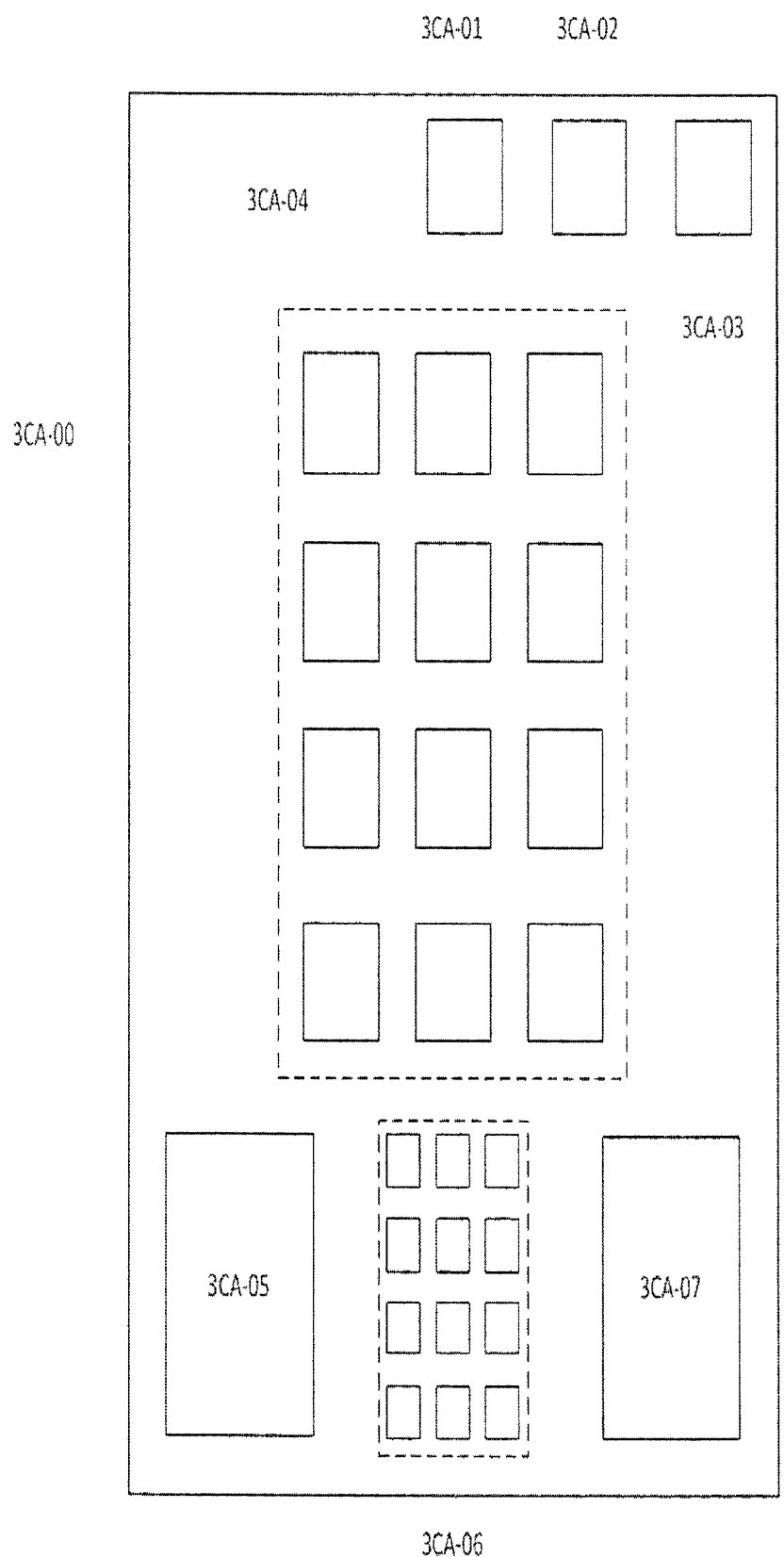
Figure 3C:
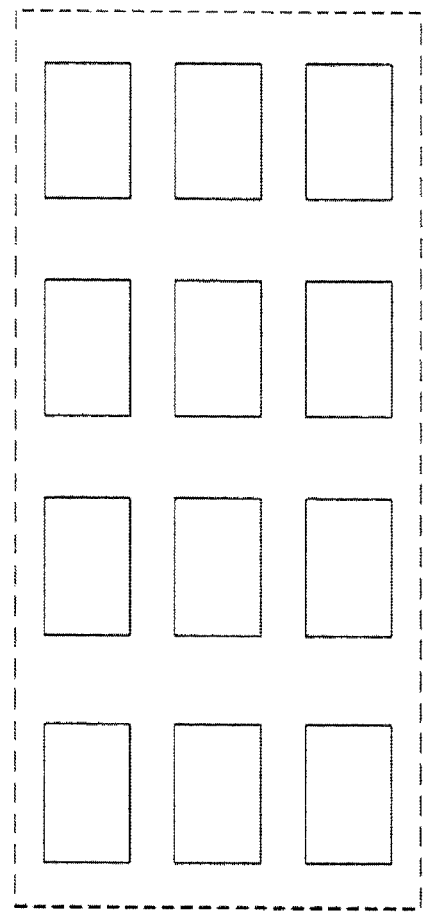

A flowchart of an embodiment is shown in FIG. 3C. Initially the user is presented with a user interface 3CA-00 running on the screen of the device as shown in FIG. 3CA. User interface 3CA-00 contains several components. Icon 3CA-01 will direct a user to a second user interface to set a secret pattern. Icon 3CA-02 allows a user to create settings for obfuscation, which will be described later. Icon 3CA-03 allows a user to generate a new randomly populated keyboard if needed. Regular keyboard 3CA-04 allows a user to enter a PIN. Icon 3CA-05 allows a user to switch between displaying a full-sized current randomly populated keyboard and a full-sized regular keyboard. Icon 3CA-06 provides a minimized view of the currently generated randomly populated keyboard. Icon 3CA-07 allows a user to switch between left hand input mode and right hand input mode.

Figure 3D:
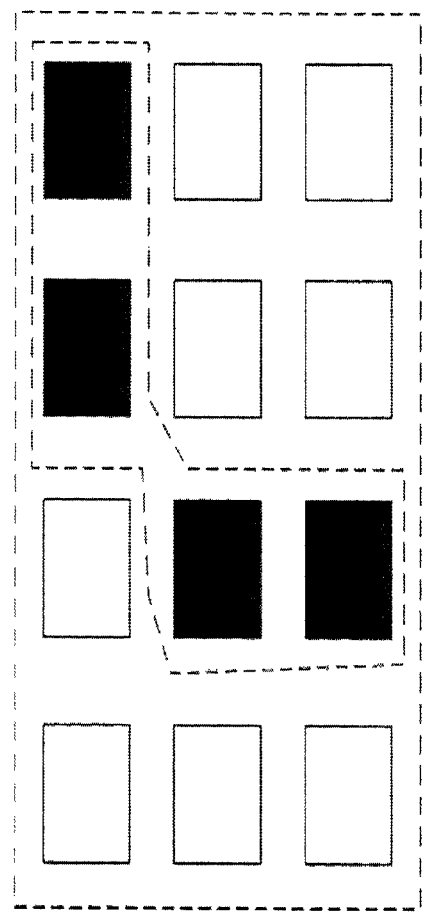
FIG. 3D shows a secret pattern selected by a user.

In step 3C-01, a secret pattern is set by the user in a secure environment. In one embodiment, this is performed by selecting some empty cells in a grid on the screen of the device. This is achieved by, for example, the user depressing an icon on a screen of the mobile device such as icon 3CA-01 on FIG. 3CA. The user is then directed to a second user interface 3CB-00 containing a grid of empty cells 3CB-01 as shown in FIG. 3CB. The user then selects the secret pattern 3D-01 as shown in FIG. 3D. While the examples below show an embodiment where a numeric keypad is the randomly populated keyboard, it would be known to one of skill in the art that other forms of keyboard are also possible. These include, for example, alphabetic keyboards or keyboards comprising other symbols.

In a further embodiment, the process of FIG. 3C is implemented by a special processing system. In one embodiment, the processing system is local to the user device. In such a case, the processing system comprises, for example, the transaction authentication information unit of FIG. 3B or more generally the operation authentication unit. Then, the secret pattern entered in step 3C-01 is stored in the user device.

In another embodiment, the process detailed in FIG. 3C is implemented as a cloud-based service. Then the processing system comprises, an application running on the user device, one or more components of the user device, such as the transaction authentication information unit, and one or more other components shown in FIG. 1, such as the fraud reporting center. In this implementation, the secret pattern entered in step 3C-01 is shared with a server, such as the fraud detection server, at the fraud reporting center. In yet another embodiment, the sharing is performed using an encryption technique known to one of skill in the art.

Figure 3E:
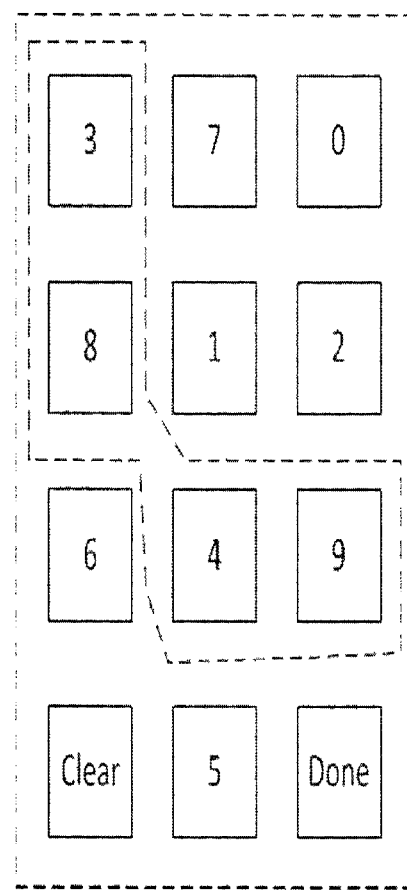
FIG. 3E shows a randomly populated keyboard.

In step 3C-02, in an optional embodiment, when the user is in an insecure environment such as, for example, a public area, the user elects to be shown a randomly populated keyboard. This is achieved by, for example, pressing icon 3CA-03 on FIG. 3CA and being presented with a current randomly populated keyboard 3E-01 such as that shown in FIG. 3E. In one embodiment, the user device generates a random number. Then, an algorithm on the user device generates the current randomly populated keyboard 3E-01 using the generated random number. Then, the user device, for example, via the transaction authentication information unit, provides a current PIN to the user by correlating the user's secret pattern 3D-01 entered in step 3C-01 to the current randomly populated keyboard 3E-01 as shown in FIG. 3E. In this case, the current PIN is 3849 as shown by the greyed cells in FIG. 3E.

In the case where the process in FIG. 3C is implemented using a cloud-based service, the random number generated earlier is sent to the fraud detection server. Then, an identical algorithm on the server generates a randomly populated keyboard identical to the current randomly populated keyboard using the random number generated earlier.

Once the user has obtained the provided current PIN provided, in step 3C-03 a regular keyboard 3CA-04 is provided for PIN entry on, for example, the screen of FIG. 3CA. When the user is entering the PIN the current randomly populated keyboard is either hidden away or minimized, as shown in icon 3CA-06 of FIG. 3CA, to prevent trace back from the attacker. However, if the user needs to, the user can always look back at the current randomly populated keyboard 3E-01 by pressing or performing a swipe with icon 3CA-06. This is useful for users who have a bad short-term memory. The processing system receives the entered PIN, and if the received PIN which was entered matches with the expected PIN then user access is granted.

In the case where the process in FIG. 3C is implemented using a cloud-based service, when the user submits the PIN, it is sent to the fraud detection server. The server uses the stored secret pattern and the current randomly populated keyboard the server generated to calculate the expected PIN and compare it against the PIN sent from the device. Based on the evaluation, the server decides whether the authentication is successful or unsuccessful. The server sends a signal to the user device with the result of the authentication.

The process outlined in steps 3C-01 to 3C-03 is useful in situations where the authentication environment is insecure. For example, authenticating in public spaces where a user's password could potentially be exposed to prying attackers. The scheme makes it harder for the attacker to obtain the user's secret by shoulder-surfing, or when the user is being watched during the authentication process. The attacker will need to remember the keyboard arrangements and the PIN in order to perform a trace back to obtain the secret pattern. Since the user knows exactly where to look, the time given to the attacker for memorization is very short.

In a further embodiment, the processing system provides motivation for the user by "gamifying" the process, that is, the faster the user is at obtaining authentication using the system proposed in FIG. 3C, the more points a user is provided by the processing system. This provides motivation to the user to memorize the randomly populated keyboard 3E-01 to avoid having to look back at the randomly populated keyboard while entering the PIN.

In a further embodiment, the process outlined in FIG. 3C can be used to implement an emergency call feature as well, in case the user needs to enter an emergency number but disguise it as a different number.

However, the process outlined in FIG. 3C has limitations. For example, an attacker/impostor can obtain the user's secret pattern via video recording or multiple observations.

In order to overcome this, users are given opportunities to obfuscate the entry of the one-time PIN based on the context in which the PIN or other data is supplied. The context relates to the state of the user or user device at the time the PIN or other data is supplied and is different from the actual PIN, password, biometric, or other data supplied. Context could include, for example, how the user is holding the user device, whether the user is reclining, sitting, running, walking and so on. In one embodiment, context is determined by obtaining information from a variety of sensors including for example, cameras, accelerometers, GPS, pressure sensors, and so on. In the case of data entry such as typing or pressing the keyboard or keypad, or swiping a line or pattern on the screen, each user will have a characteristic way of making the gesture that will differ based on pressure exerted, speed, direction, and angle of the gesture among other factors.

Figure 3F:
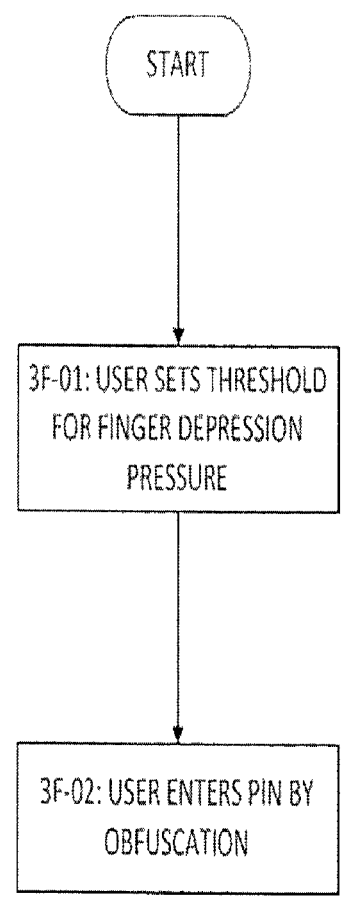
FIG. 3F shows a flowchart for an embodiment of PIN entry obfuscation.

FIG. 3F demonstrates an embodiment to obfuscate the entry of the one-time PIN. In one embodiment, this obfuscation comprises the user entering digits randomly to confuse an attacker. However, the user is able to distinguish the entry of false and real digits by pressing buttons on the keyboard with differing strengths.

In step 3F-01, in an embodiment the user sets a threshold for finger depression pressure so that the user is able to denote which key presses are real and which are not. For example, in one embodiment, the user sets a rule whereby any key press where the depression strength is lower than the threshold is denoted as false, and any key press where the depression strength is higher than the threshold is denoted as real.

Figure 3G:
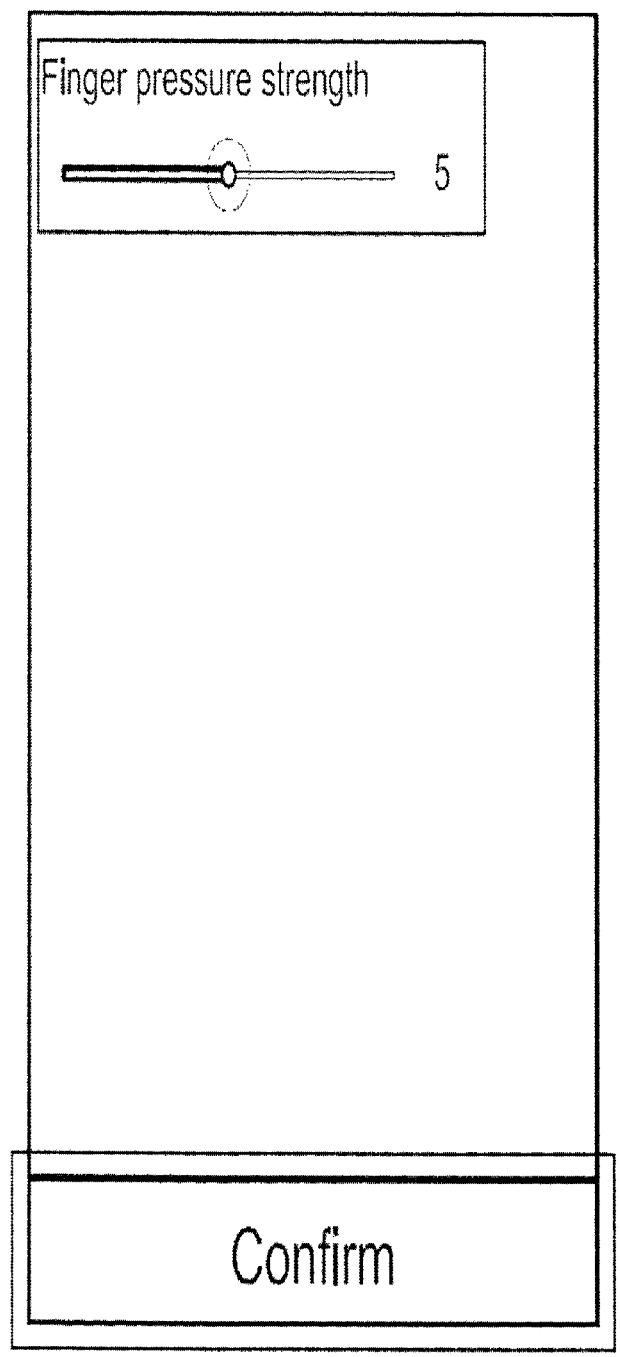
FIG. 3G shows a screen for a user to set a threshold for finger depression pressure.

This is achieved by, for example, the user pressing icon 3CA-02 on FIG. 3CA and being sent to a user interface such as interface 3G-00 shown in FIG. 3G. In FIG. 3G, a threshold on a scale from for example 0 to 10, is set by sliding the circle along the horizontal line in the slider bar 3G-01. For example, in FIG. 3G a threshold of 5 is shown. In an embodiment, the user is presented with the opportunity to set a plurality of thresholds based on the context of the user. Once the user has entered a threshold or thresholds, the user hits the "Confirm" button 3G-02 as shown in FIG. 3G.

Figure 3H:
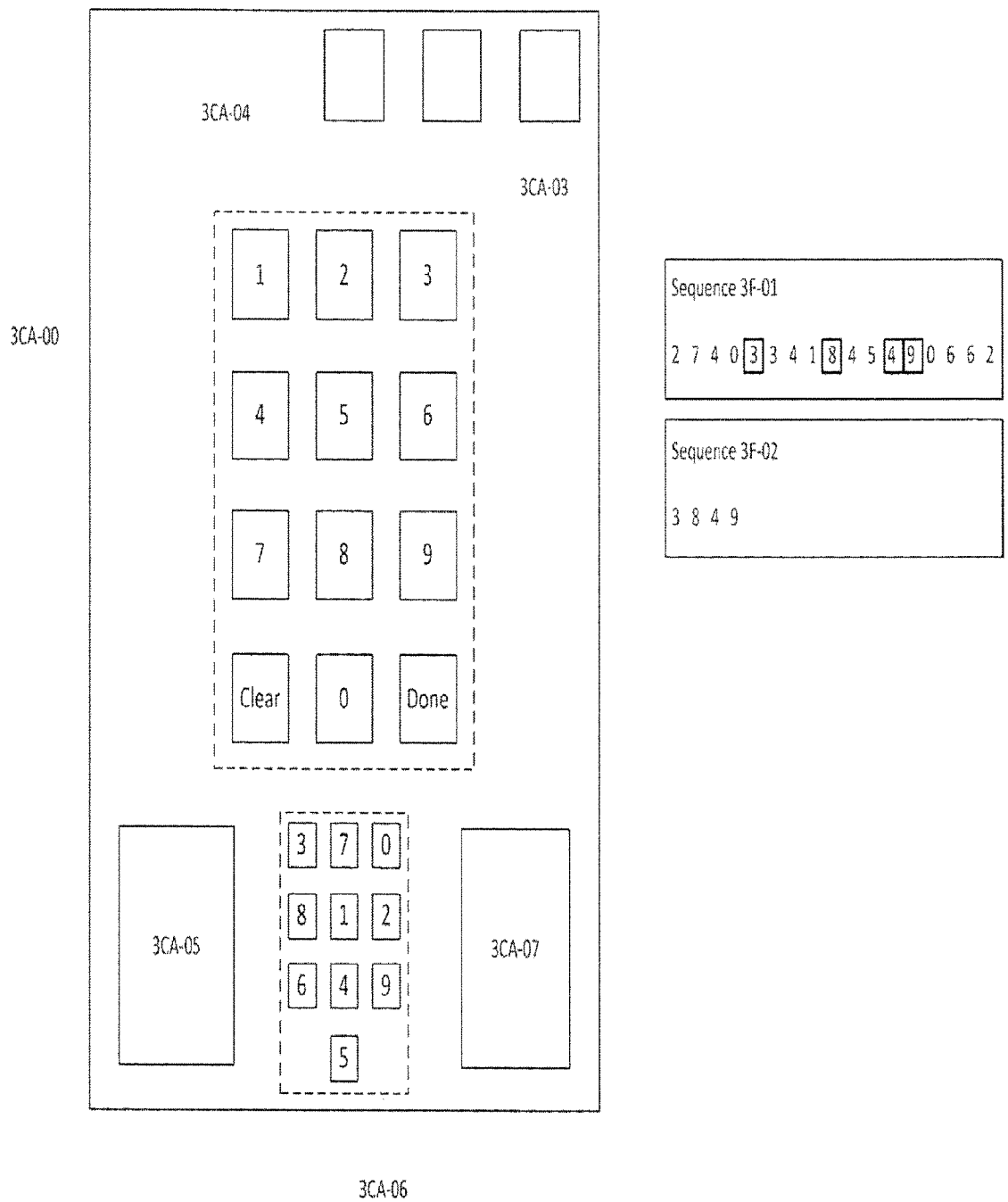
FIG. 3H shows an example of a sequence for PIN entry obfuscation.
Figure 31:
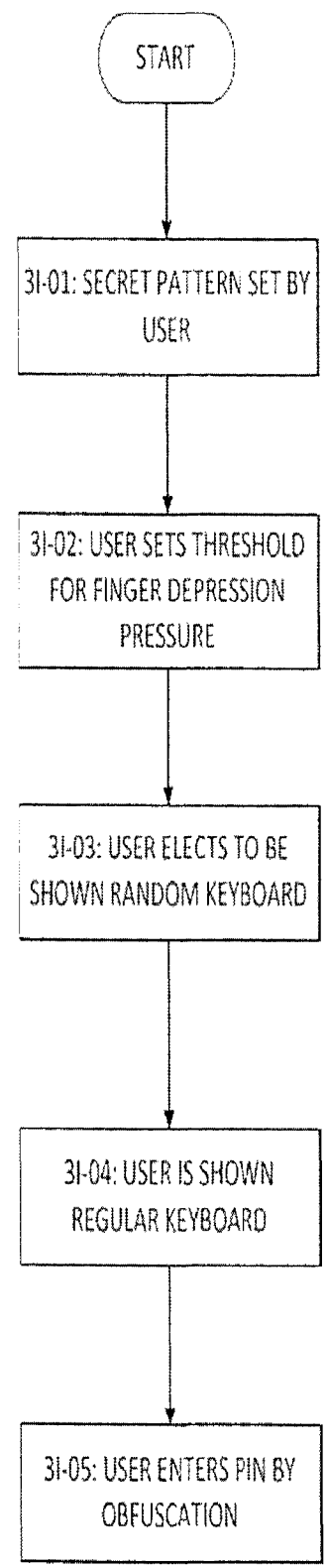

In step 3F-02, the user enters the PIN by obfuscating it. An example is presented in FIG. 3G. Using the example from before, if the user's one-time PIN is 3849, the user enters the sequence 3F-01 shown in FIG. 3H. The user presses the digits 3, 8, 4 and 9, denoted using boxes, with a depression strength higher than the threshold. Then the digits except for 3, 8, 4 and 9 are known to be false. When the user presses "Done" on keypad 3CA-04, only sequence 3F-02 '3849' will be recorded. In an embodiment, the user device detects the context of the user and based on the detected context, chooses the threshold.

In another embodiment, in step 3F-02 the obfuscation is achieved by, for example, making the user touch a specific area on the screen 3CA-00 with a thumb whenever the user enters a real digit. While this requires the user to use two hands for input, the other hand can act like a cover to hide away the thumb. Other implementations are also possible using a variety of sensors. For example, the user blocks a camera or other sensor on the user device whenever a real digit is entered.

There is a need for the user to receive feedback so that the user knows whether a button press is recorded as real or false. In a further embodiment, the user is provided with different types of personalized feedback whenever the user presses a real digit or a false digit. An example of personalized feedback is vibration, since this is something that only the user can detect during the authentication process, and is hidden from an attacker who is observing the process.

Using the example from previously, in step 3F-02 whenever the user presses buttons with depression strength that is higher than the threshold, the device sends a first vibration feedback signal to the user. If the depression strength is lower than the threshold, in one embodiment, the device does not send a vibration feedback signal. In another embodiment, the device sends a second vibration feedback signal. In the previous example, when the user entered the digits 3, 8, 4 and 9 in the sequence, the first vibration feedback is sent to the user. When the user enters the digits other than 3, 8, 4 and 9, either no feedback is sent to the user, or a second vibration feedback is sent to a user.

Another example of personalized feedback is by making the user put on a pair of specific headphones and sending different feedback sounds corresponding to real and false digits.

FIG. 3I shows an example flowchart where the obfuscation process of FIG. 3F is combined with the random PIN entry process of FIG. 3C. Steps 31-01, 31-03 and 31-04 are similar to steps 3C-01 to 3C-03 respectively, which are performed as previously discussed. Step 31-02 and 31-05 are similar to steps 3F-01 and 3F-02. As would be known to one of skill in the art, this is not the only way to combine these two processes. For example, the order of steps 31-02 and 31-01 can be reversed.

In a further embodiment, the processes described in FIGS. 3F and 3I are implemented within the user device using, for example, the transaction authentication information unit of FIG. 3B or more generally the operation authentication unit, as previously explained. In a further embodiment, the process described in FIGS. 3F and 3I are implemented as a cloud-based service by the user device in conjunction with one or more components of the system shown in FIG. 1, such as, for example, the fraud reporting center and the fraud prevention system.

If the user enters an incorrect PIN, leading to a failure of authentication, then in one embodiment, further verification is performed as detailed in the section below titled "Authentication Fails—Verification Required".

In a further embodiment, if the processes detailed in FIGS. 3C, 3F and 3I fail, in one embodiment the transaction authentication unit or more generally the operation authentication unit will communicate with other servers such as, for example, the fraud reporting unit of FIG. 1 to determine if, for example the user device has been stolen. If the device has been stolen, then in one embodiment the operation authentication unit moves sensitive data away from the user device, to a secure location such as, for example, a cloud-based storage system. Optionally, one or more apps running on the user device may be deleted.

Valid Authentication—No Verification

Figure 4A:
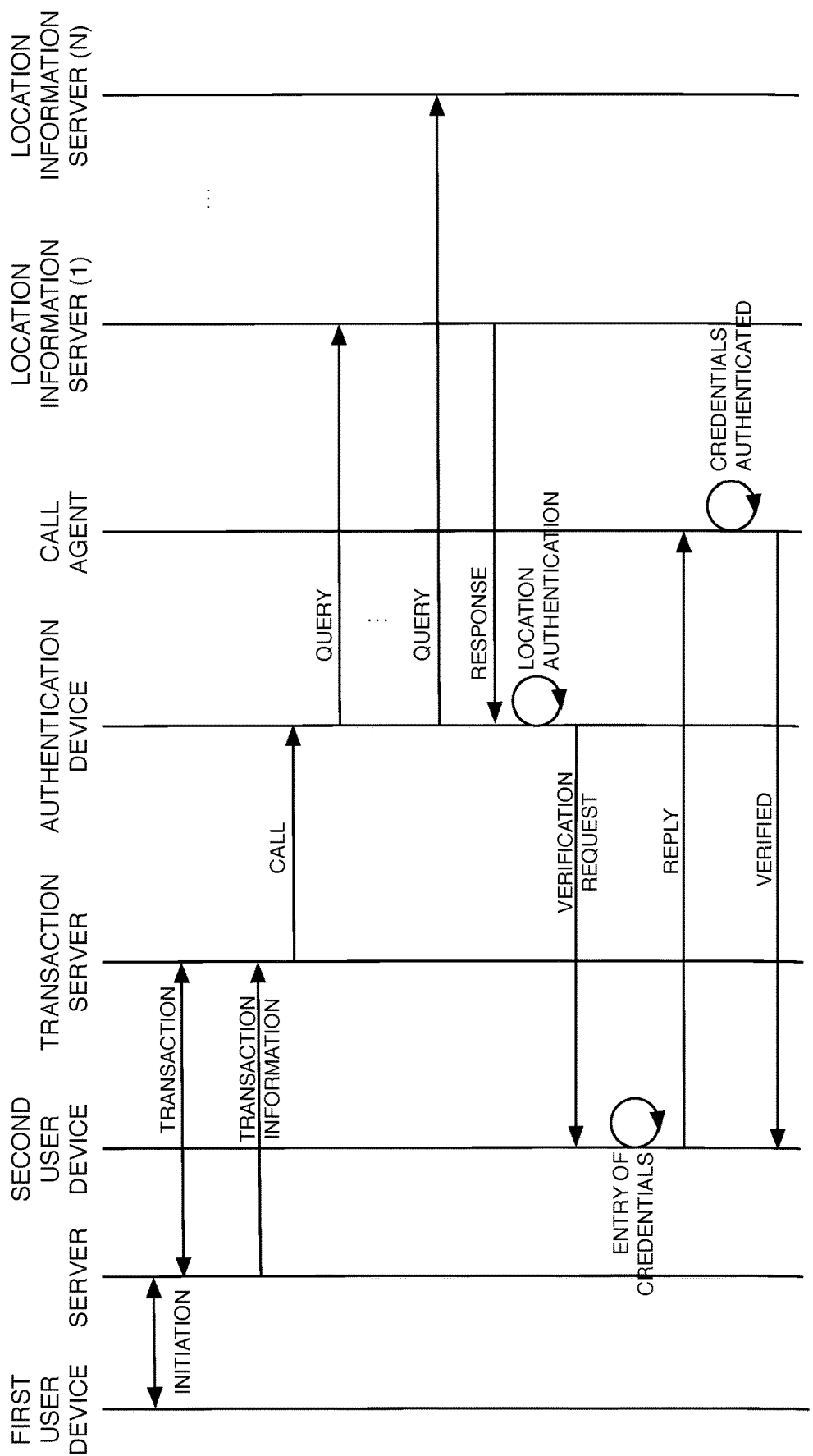
FIG. 4A is a messaging flow diagram for one embodiment of authentication of a transaction in the network communications system for a case when authentication of a transaction succeeds.

Referring to FIG. 4A shown is a messaging flow diagram for an example of authentication of a transaction in the network communications system of FIG. 1 for a case when authentication of a transaction is deemed valid. A transaction between a transaction server and a server at a transaction site initiated by a user at a first user device is established. User specific information utilizing various characteristics is analyzed.

In the following example, one of the primary characteristics analyzed is location. During initiation of the transaction the user device provides first location information on the location of the first user device, and the server at the transaction site transmits transaction information necessary for the transaction to the transaction server. The information includes, among other information, the first location information on the user device, together with a phone number of the user, for example. As discussed above, in some implementations the information includes additional characteristic information related to the first user device. The transaction server calls an authentication device and the authentication device requests second location information defining the location of a second user device associated with the transaction from location information servers 1 to N, each at one of N communications service provider sites where N is an integer with N>1. The location information server of the communications service provider that provides communications services to the second user device provides a response containing the second location information. In some implementations the authentication device is provided with an identification of the communications service provider that provides communications services to the second user device and the query is sent only to one location information server. In some embodiments, the fraud prevention system includes a fraud prevention unit, a database, as well as authentication device, third party interface (e.g., call agent), and transaction server.

Responsive to receiving the second location information, the authentication server performs location authentication by determining a level of correlation between the first location and the second location and authenticates the transaction based on the level of correlation between the first location and the second location. For example, in one implementation the authentication is valid if the distance between the first and second locations is less than 50 km; otherwise, it fails. A verification request is sent to the second user device in response to the location authentication requesting user credentials. In some implementations the user credentials include a PIN (Personal Identification Number), implicit information, or biometric information. Biometric information can include reading fingerprints, iris scans, temperature, pulse rate, facial recognition as well as other methods. Responsive to receiving the authentication request the user credentials are entered and a reply containing the user credentials is transmitted to the authentication device. The user credentials are authenticated and the authentication device transmits a message to the second user device indicating that the authentication has been verified.

In some embodiments, the authentication is done locally on the first or second device and not transmitted; only the authentication success/failure information is transmitted.

As discussed above, in some implementations for some transactions there is no need for authentication using user credentials and in such cases there is no verification of user credentials when authentication based on location or other invisible correlation information succeeds.

In the exemplary scenario of FIG. 4A authentication of the transaction succeeds and further verification need not be applied.

Authentication Fails—Verification Required

A different scenario in which the location authentication transaction originally fails will now be described with reference to FIG. 4B.

Figure 4B:
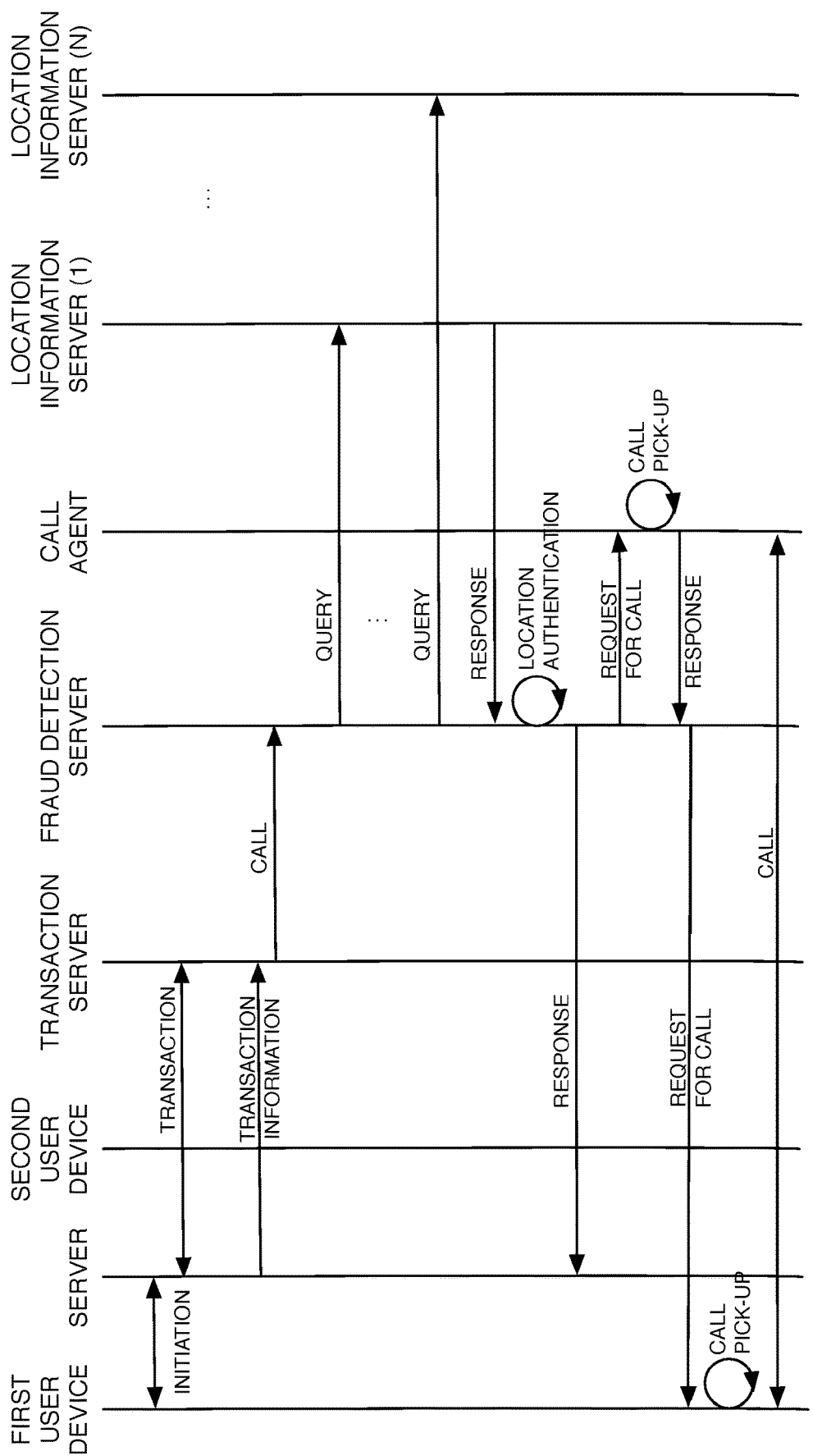
FIG. 4B is a messaging flow diagram for one embodiment for authentication of a transaction in the network communications system for a case when authentication of a transaction originally fails.

In FIG. 4B, the signaling process is similar to that of FIG. 4A up to the point where location authentication is performed. In this case the correlation between the first and second locations is not sufficiently high and results in a failed authentication during the location authentication step. In response to the failed authentication, the fraud detection server sends a response to the user device with information on the failed authentication.

At this point verification may be implemented to verify the identity of the individual. In some embodiments, verification includes a person to person interaction to identify an individual. In some embodiments, verification includes utilizing one or more user based characteristics not initially used for authentication.

Continuing in FIG. 4B this example implements a person to person verification by means of a call agent. The fraud detection server sends a request to a call agent for establishing a call between the call agent and the first user device. The call agent picks up the call and sends a response to the fraud detection server indicating that the call has been picked up. The fraud detection server also sends a request to the first user device for the call. The first user device picks up the call. The request contains information necessary for the first user device to establish the call with the call agent, communicates with the call agent, and the call is established. A user at the first user device and the call agent can communicate with each other to perform authentication.

It is contemplated that multi-party third party verification may occur. For example, in a family setting, if the husband has the mobile device but the wife is using the credit card at a separate location, the third party agent may verify the authorization with both parties with consent of the cardholder.

In some embodiments, the user at the first user device may be required to provide additional authentication information so that the transaction can be allowed. The additional authentication may include any of the user specific characteristics listed previously. Additionally, the information may include any one or more of the user's mother's maiden name, the user's birth date, and the name of the user's preferred pet, for example. If the user cannot provide the correct additional authentication information the transaction is refused.

In FIG. 4B the request for a call is initiated by the fraud detection server by sending requests to both the call agent and the first user device. However, it is to be clearly understood that implementations are not limited to this particular implementation. For example, in another implementation the fraud detection server informs the call agent that a call is to be established between the call agent and the second user device, and the call agent initiates the call by sending a request to the second user device.

As discussed above, the first user device at which a transaction is initiated may be a mobile phone, a personal computer, or a debit/credit card reader for example. In the case of a personal computer or a debit/credit card reader, for example, the call may be established with the user's user call device such as a mobile phone, home phone, VOIP phone, for example.

Furthermore, in some cases a transaction with the transaction server may be initiated by the user device through one or more servers. For example, a user may be at a PC (Personal Computer) and making a purchase and payment on the Internet. The servers might be controlled by merchants for example or by entities that offer Internet payment services, such as PayPal® for example. In such a case, the transaction may be conducted between a server and the transaction server. The user device communicates with the server and the server relays location information on the first user device to the transaction server.

Figure 4C:
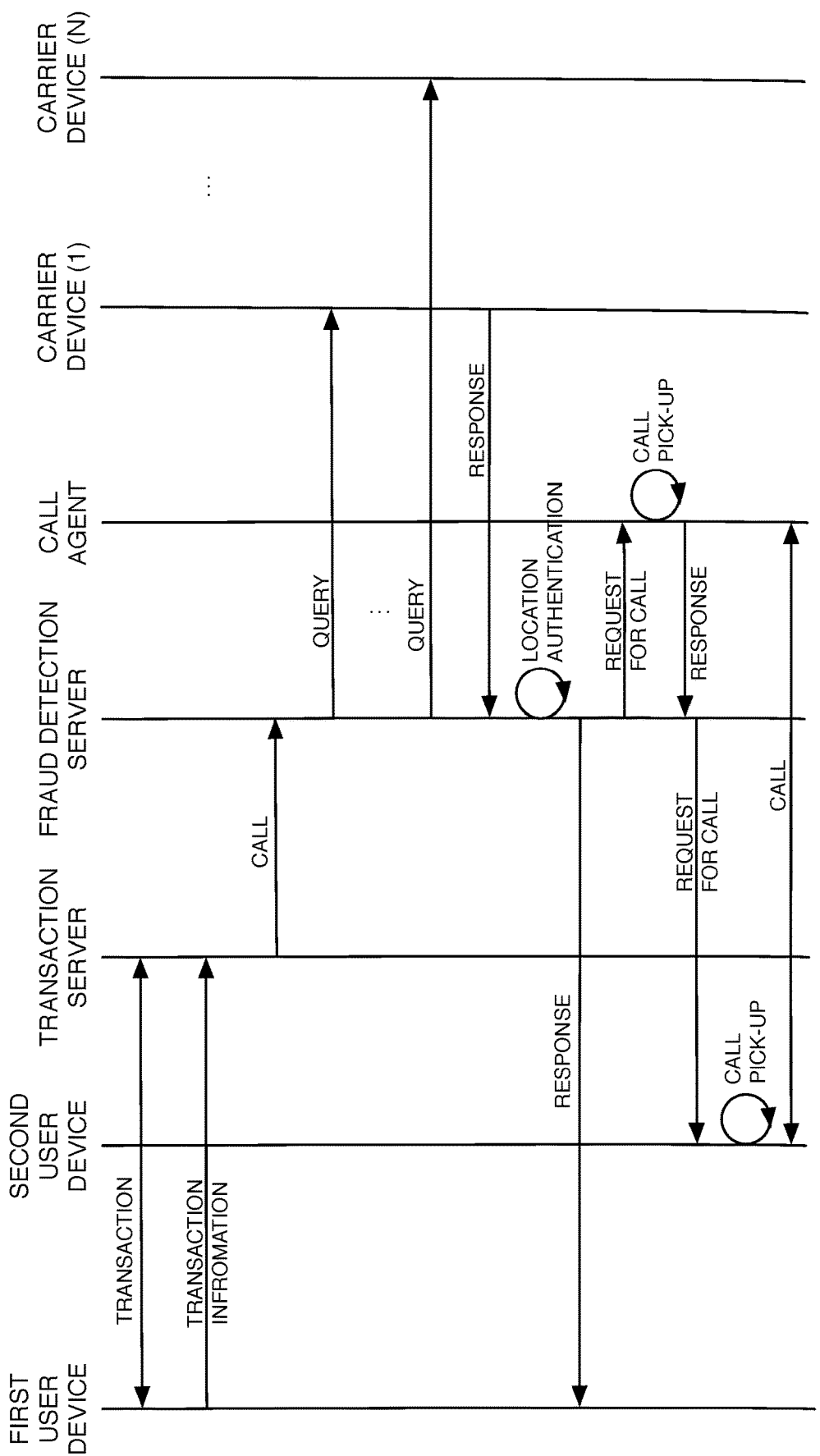
FIG. 4C is another messaging flow diagram for one embodiment of authentication of a transaction in the network communications system for a case when authentication of a transaction originally fails.

Referring to FIG. 4C, shown is another messaging flow diagram for authentication of a transaction in the network communications system of FIG. 1 for a case when authentication of a transaction originally fails. The messaging flow diagram of FIG. 4C is similar to that of FIG. 4B except that in this case upon a failed authentication, a call is established between a second user device and the call agent instead of between the first user device and the call agent.

For example, the second user device may be a bank's landline phone system, a lending instruction's VOIP service, or an investment firm agent's mobile phone.

More particularly, in response to the failed authentication the fraud detection server sends a response to the server with information on the failed authentication. The fraud detection server also sends a request to the call agent for establishing a call between the call agent and the second user device. The call agent picks up the call and sends a response to the fraud detection server indicating that the call has been picked up. The fraud detection server also sends a request to the second user device for the call. The second user device picks up the call. The request contains information necessary for the second user device to establish the call with the call agent. The second user device communicates with the call agent and the call is established. The user at the second user device and the call agent can communicate with each other to perform authentication.

For example, the user at the second user device may be required to provide additional authentication information so that the transaction can be allowed, as described above with reference to FIG. 4B.

Fraud Prevention Communication System utilizing Aggregate User Data

An additional embodiment to the invention includes the utilization of the one or more user specific characteristics to notify users of the system that certain merchants and/or specific goods or services may be suspect given previous transaction history. In this way, the system may implement a preventative fraud protection scheme. In some embodiments, the aggregation of user based transaction related data history is used as one of the specific characteristics.

Flagging Transactions at Point of Sale

An additional fraud prevention mechanism which uses a notification system can also be implemented by confirming transactions with client/user when they are underway. More particularly, the mechanism involves a method of verifying whether a transaction being conducted over a communications network is fraudulent. The transaction has associated with it transaction information and a user device for fraudulence verification.

The method involves comparing the transaction information with other information in a database to determine whether a transaction is potentially fraudulent. A request is sent to a user device requesting user credentials and confirmation information on whether the transaction is fraudulent or not. In response to receiving a response with the user credentials and the confirmation information, a determination of whether the user credentials allow access to the transaction is made and the transaction is authenticated using the confirmation information only if the user credentials allow access to the transaction. Such a mechanism will now be described in more detail with reference to FIG. 5, FIG. 6A, and FIG. 6B.

The user may flag the transaction utilizing various degrees of concern. In some embodiments, the user may flag the current transaction as "concerned" which lets the transaction through but flags the transaction for a follow up check at a later time.

Alternatively, the user may flag the current transaction as "suspected fraud" where a third party (e.g., a call agent) is contacted to initiate further verification. Additionally, the user may flag the current transaction as "definitely fraud" where the transaction is blocked from proceeding and third party authorities are notified.

In some embodiments, the notifications with respect to a specific merchant or vendor are stored in a database where each of the previous flags assigned per transaction at the merchant by users of the system are saved. In this way, when a new user visits a merchant which has questionable credentials based on the database analytics within the fraud detection unit, the database will send a summary of the previous transaction flagging history to the user currently processing a transaction such that the user may take this information into account prior to proceeding with the processing of the transaction.

In some embodiments, the threshold for calculating the tolerance for suspicious activity changes with volume of transactions. Furthermore, the threshold may be set manually by the system administrator or dynamically but process given input from various data inputs (e.g., transaction information).

Fraud Prevention System Implementation

Figure 5:
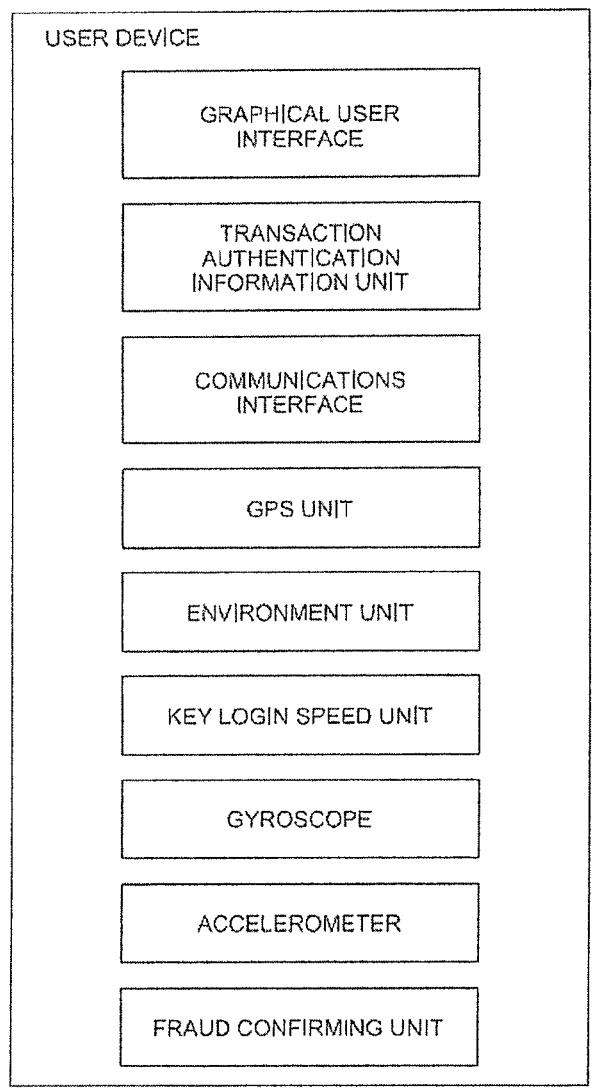
FIG. 5 is a block diagram of an example of user device suitable for use with the fraud prevention system.

Referring to FIG. 5, shown is a block diagram of another user device suitable for use with the fraud prevention system of FIG. 1. The user device is similar to the user device of FIG. 3B except that it includes a fraud confirming unit In FIG. 5, the functionality of each of the graphical user interface, the transaction authentication unit, the communications interface, the GPS unit, the environment unit, the key login speed unit, the gyroscope, the accelerometer, and the fraud confirming unit can be implemented using any suitable combination of software, hardware, and firmware.

The transaction authentication unit communicates with the fraud confirming unit to collectively provide a mechanism for responding to requests for verification that has been recently carried out, and on-going transactions are indeed non-fraudulent transactions and for flagging fraudulent transactions.

Such a mechanism will now be described in more detail with reference to FIG. 6A, which is a messaging flow diagram for authentication of a transaction in the network communications system of FIG. 1 in a push system for a case when verification of fraudulence of a transaction shows fraudulence. In this messaging flow a transaction is underway between a server at a transaction site and an authentication, and the authentication device sends a VERIFY message to a fraud reporting unit containing information regarding the transaction. The fraud reporting unit may be located at a fraud reporting center that contains a database, such as the fraud reporting centers of FIG. 1.

The information contained in the VERIFY message includes information suitable for identifying a fraudulent user, such as a fraudulent merchant for example. For example, the information may include but is not limited to any one or more of the location of the user device requesting the transaction, identification of the user device, identification of the user of the user device, the number of transactions of a particular merchant, user, or other entity, which have been identified as fraudulent and/or the number of transactions of a particular merchant, user, or other entity, which have been identified as potentially fraudulent, and any user specific information.

The fraud reporting unit verifies its database to determine whether the received information matches any entry in the database that would confirm that the transaction is potentially fraudulent.

For example, the database might contain an entry for a particular merchant called "EadEuy" for example, with the entry indicating five fraudulent transactions in the last three days. As such, in some implementations any transaction from this merchant would be identified a potentially fraudulent. The fraud reporting unit replies to the authentication device with a REPLY message indicating whether the transaction is potentially fraudulent or not. The authentication device verifies whether the message indicates a potentially fraudulent transaction or not, and in this case the transaction is potentially fraudulent. The authentication device sends a VERIFICATION message to the user device indicating that a potentially fraudulent transaction is underway and requesting user credentials and confirmation of whether the transaction is indeed fraudulent or not.

The user provides input of the credentials and in this case the user confirms that the transaction is indeed fraudulent by sending a REPLY message to the authentication device. The REPLY message contains information confirming that the transaction is fraudulent together with the user credentials. The authentication device verifies that the user credentials are correct and determines that the transaction is fraudulent based on the information contained in the REPLY message.

In this example, the authentication device then sends a notification message to a call agent containing information related to the transaction. For example, the information includes any one or more of the location of the user device requesting the transaction, identification of the user device, identification of the user of the user device, and any user, merchant, or other entity[5] s or transaction specific information. The call agent looks up which fraud reporting units are to be notified and relays the received NOTIFICATION message to the fraud reporting units.

In some embodiments, this may lead to a block being applied on the user's card or transactions so that further transactions are not allowed, until the issue is resolved.

Responsive to receiving the NOTIFICATION messages, the fraud reporting units update their respective databases with the information contained in the NOTIFICATION messages. The fraud reporting unit that receives the VERIFY message also looks up its database to identify other user devices that should be notified for potentially fraudulent transactions.

For example, the fraud detection unit may look through transactions in its database which have occurred in the last sixty days together with on-going transactions and identify transactions from a particular user device. Alternatively, the fraud detection unit may look in its database for transactions which have occurred in the last sixty days, together with ongoing transactions, and identify potentially fraudulent transactions involving a specific amount from a particular merchant. The fraud reporting unit then sends a NOTIFICATION REQUEST containing call information for calling other user devices associated with the identified potentially fraudulent transactions, together with information on the potentially fraudulent transactions. Responsive to receiving the NOTIFICATION REQUEST, the call agent sends NOTIFICATION to the other user call devices.

The notification may be in any format for which can be received on a user device. In some embodiments, the notification is in the form of a rich push notifications including, but not limited to, an email, an SMS, instant message, VOIP call, or a phone call, and other medium of electronic messaging. Furthermore, each notification includes information for identifying a respective transaction and allowing the user to determine whether the transaction is indeed fraudulent.

Fraud Detection Unit Analytics

As mentioned previously, the fraud detection unit monitors various aspects of the transaction and takes into circumstances into the weighted decision. Analysis includes clustering merchants and transactions by their characteristics (e.g., location, type of business, ownership, item purchased) and comparing those clusters with clusters of individuals making the purchase (e.g., gender, age, purchase history, known interests).

These multidimensional cluster comparisons are performed to estimate the a-priori probability of a given transaction.

Further characteristics may be populated for the fraud detection unit including mining for online consumer complaints on transactions and merchants, mining location and update time information from web posts and social media sites, and analyzing mobile user flagged transactions. This type of information is analyzed and adapted to the database to provide better analysis and notifications without involving third parties and direct user interaction requiring responses.

The database also takes into consideration authentication history. This includes the number of failed authentications for a particular device. The device may be for a merchant or a customer. Each time a device tries to authenticate with a device for a transaction, the database is updated to with another entry of data to populate. In this fashion, the authentication success rate may be utilized as an indicator of whether a particular device is suspicious of illegitimate conduct based on the number of failed authentication attempts and secondly how contemporaneously the failed authentication occurred.

Figure 7:
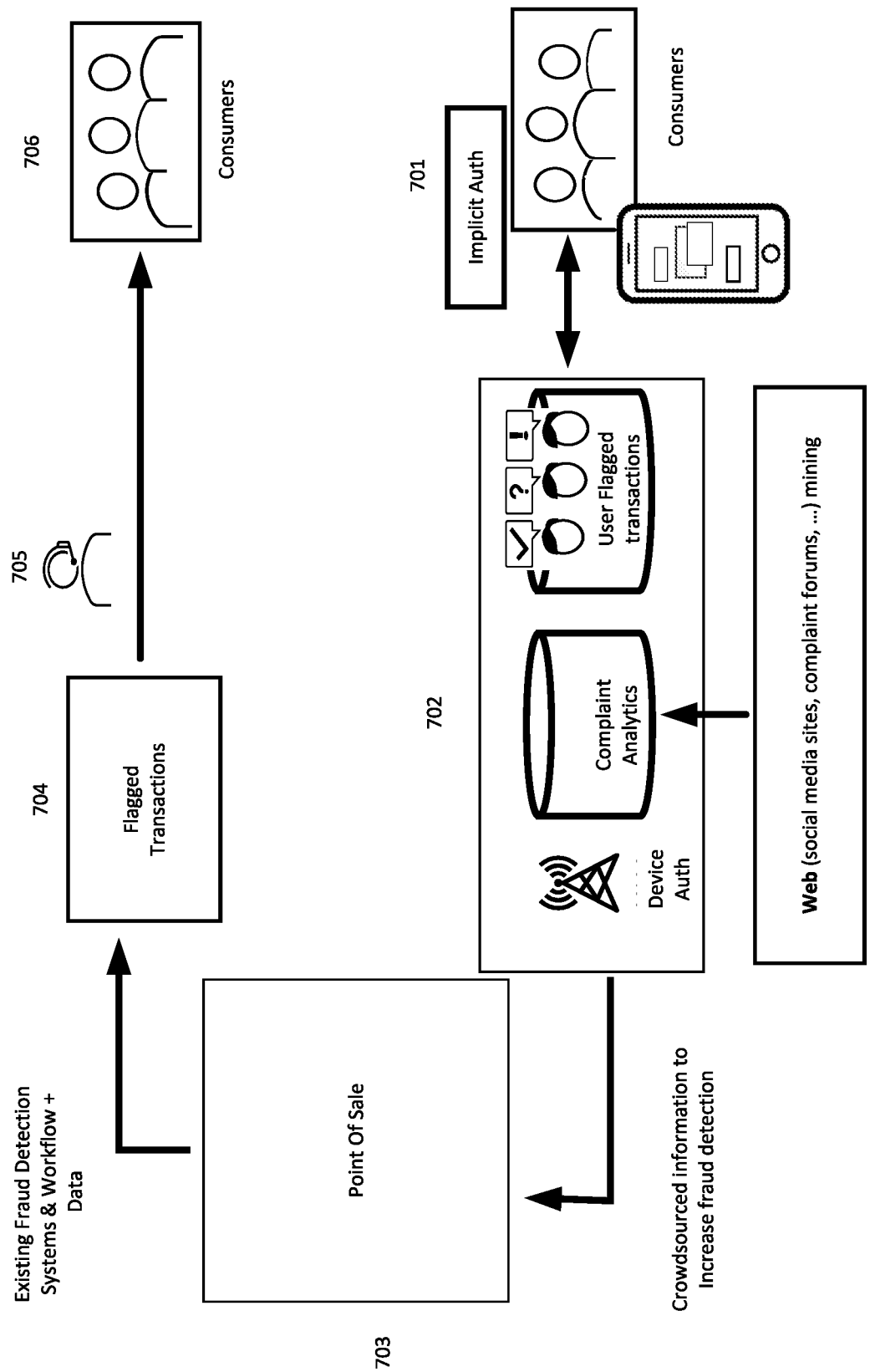
FIG. 7 represents a flow diagram of one implementation of the fraud detection unit method.

An example of the system implementation can be seen in FIG. 7. The user authenticates with the system implicitly (701), at which point the fraud detection unit retrieves any relevant and related user specific information related to the specific merchant. Said information may be flagged within the system, or as mentioned previously, information may include consumer complaints in forums and social media sites (702), for example.

This information is analyzed to verify whether the information in aggregate meets a pre-determined threshold to alter behavior or require a notification to be sent to the user before the transaction, at the point of sale (703), or post-transaction.

In situations where the threshold is met, the transaction is flagged (704) and a third party may be involved for further verification (705). Said system provides a fraud detection system and fraud resolution management (post transaction) for consumers (706) or users of the system.

For example, if the transaction is at a coffee shop, the characteristics analyzed will be with respect to coffee shops or other merchants with coffee shop like characteristics. Therefore the analytics by the fraud detection unit are targeted to the specific transaction and allow for a more accurate notification given to the user.

Figure 6A:
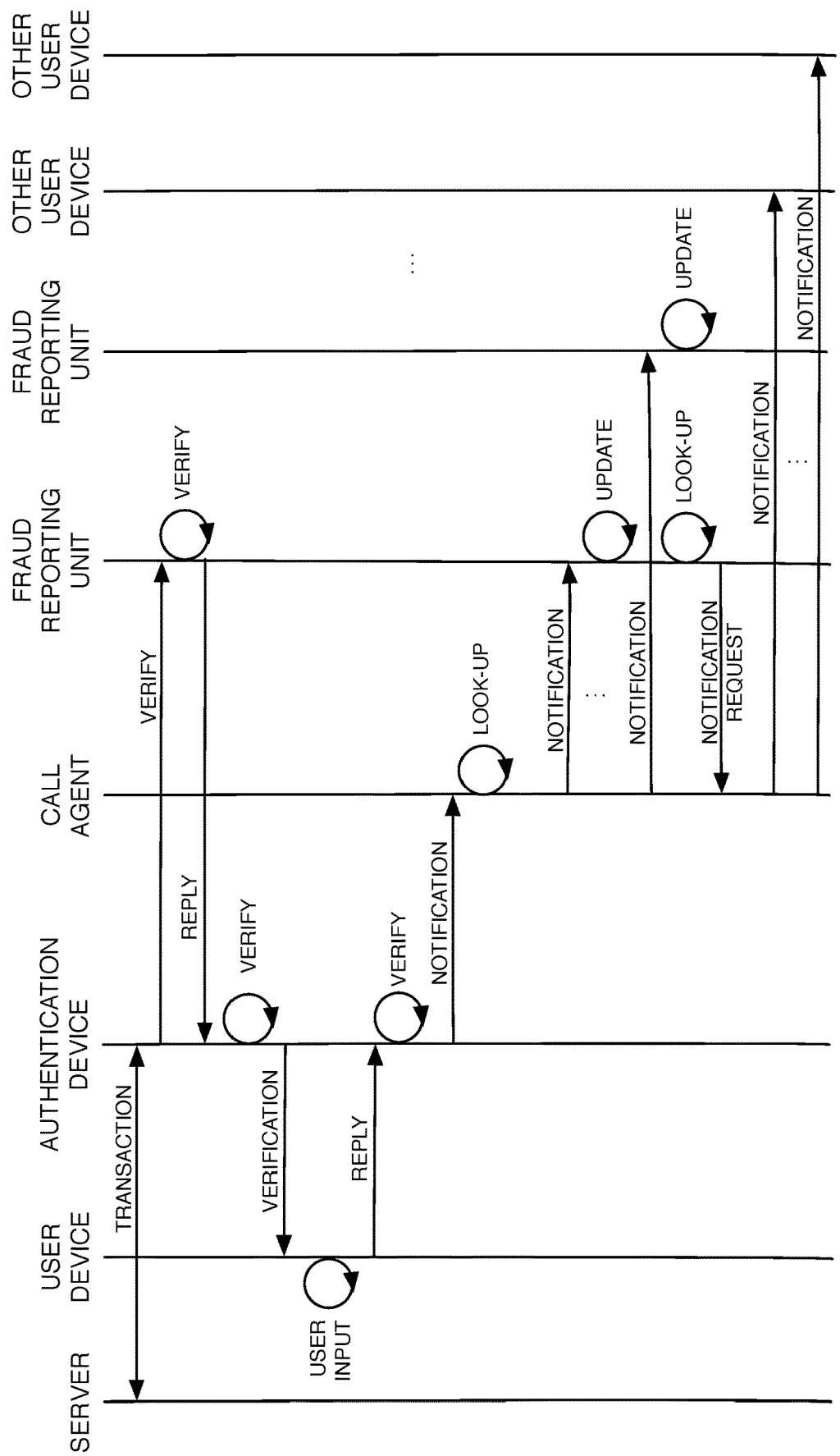
FIG. 6A is a messaging flow diagram for one embodiment of authentication of a transaction in the network communications system in a push system for a case when verification of fraudulence of a transaction shows fraudulence.

In the embodiment of FIG. 6A, the user must enter the proper credentials before confirmation of whether a transaction is fraudulent is accepted. However, in other implementations the confirmation is accepted without the need for credentials.

Figure 6B:
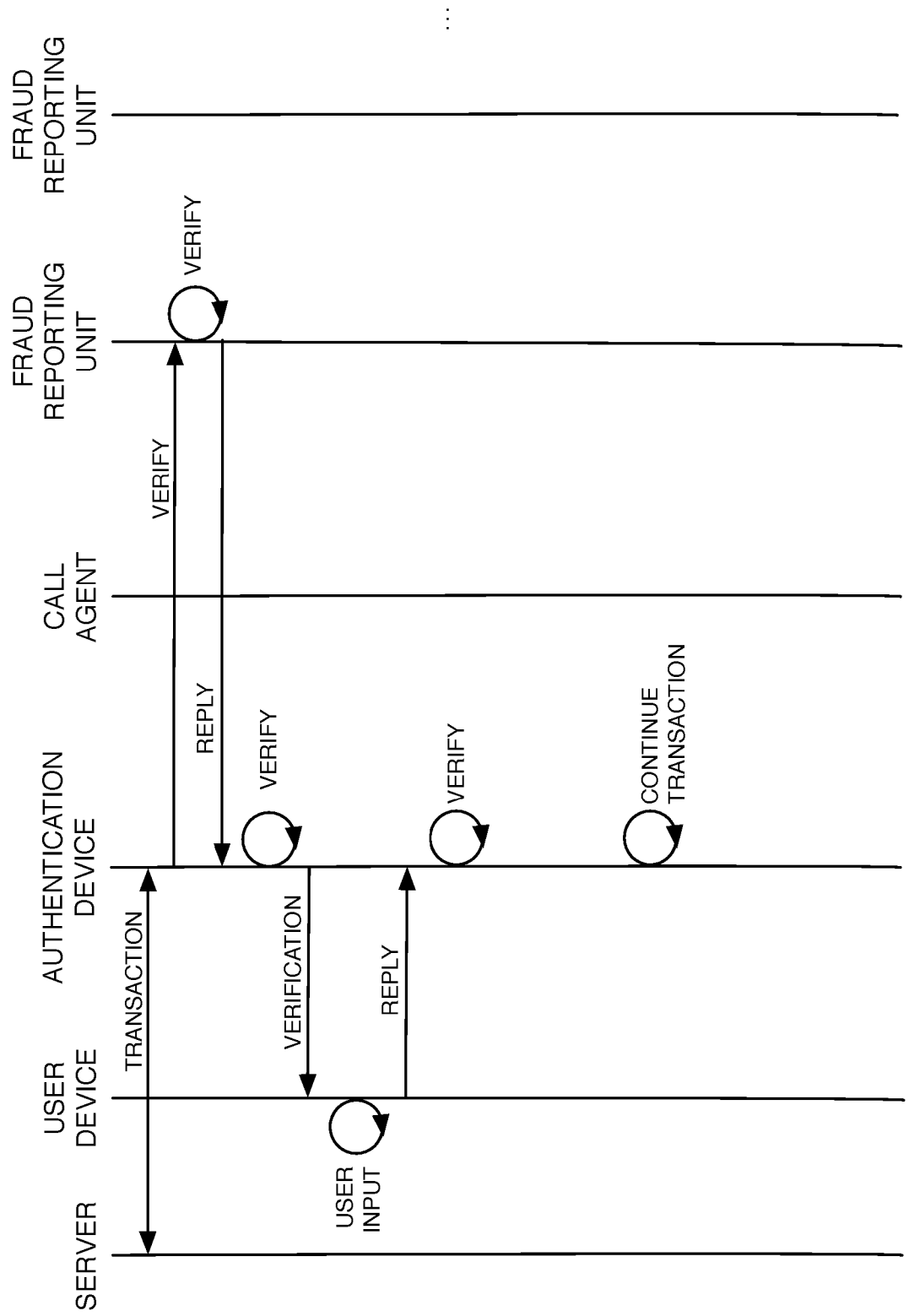
FIG. 6B is a messaging flow diagram for one embodiment of authentication of a transaction in the network communications system in a push system for a case when verification of fraudulence of a transaction shows no fraudulence.

Referring to FIG. 6B, shown is a messaging flow diagram for authentication of a transaction in the network communications system of FIG. 1 in a push system for a case when verification of fraudulence of a transaction shows no fraudulence. In this messaging flow a transaction is underway between a server at a transaction site and an authentication device. The authentication device sends a VERIFY message to a fraud reporting unit containing information regarding the transaction.

The information contained in the VERIFY message includes information suitable for identifying a fraudulent user. The fraud reporting unit verifies its database to determine whether the received information matches any entry in the database that would confirm that the transaction is potentially fraudulent. The fraud reporting unit replies to the authentication device with a REPLY message indicating whether the transaction is potentially fraudulent or not. The authentication device verifies whether the message indicates a potentially fraudulent transaction or not, and in this case the transaction is not fraudulent.

The authentication device sends a VERIFICATION message to a user device associated with the transaction indicating that a transaction is underway and that the transaction does not appear to be fraudulent. Nonetheless, the VERIFICATION message is used for requesting user credentials and confirmation of whether the transaction is indeed fraudulent or not.

The user provides input of the credentials and in this case the user confirms that the transaction is not fraudulent by sending a REPLY message to the authentication device. The REPLY message contains information confirming that the transaction is not fraudulent together with the user credentials. The authentication device verifies that the user credentials are correct and determines that the transaction is not fraudulent based on the information contained in the REPLY message. During verification the authentication unit determines that the transaction is not fraudulent and the transaction process continues.

In FIG. 6A and FIG. 6B, in some instances the transaction is being performed in real-time and the transaction cannot continue unless the user confirms that the transaction is not fraudulent. In other instances, the transaction is being initiated by a third party such as a merchant entering credit card information for a related purchase for example, and the transaction is put on hold until the user has had a chance to confirm whether the transaction is fraudulent or not. In some implementations, when a transaction has been identified as having no potential threat of fraudulence by the fraud reporting unit the transaction continues without any further verification with the user at the user device.

In FIG. 6A and FIG. 6B, in some implementations if the user credentials are incorrect, the user is asked to re-enter the credentials until the correct credentials are entered or until a maximum number of attempts is reached. When the maximum number of attempts is reached the authentication device contacts a third party to establish a call with the user's user call device.

The third party may be any third party required to verify the identity of the user conducting the transaction. In some embodiments, the third party is a call agent. The third party may be any party required from merchants, banks, consumers, and others in the ecosystem required to identify the user.

The messaging between the user device and the authentication device can be implemented using any suitable protocol. This may include mobile platform such as those used in Apple® iOS, Google® Android, BlackBerry®, Microsoft Windows Phone 8®, and other smartphones. Alternatively, with reference to FIG. 5, in some embodiments, the fraud confirming unit, the transaction authentication information unit, and the graphical user interface can be can be used to present the user with a request for confirmation of whether a transaction is fraudulent by presenting the user with an interface for entering the credentials and also with selectable buttons for confirming whether or not the transaction is fraudulent.

A number of mechanisms used for performing authentication have been described. In some embodiments, these mechanisms are used together to provide secure transactions. For example, in some embodiments, a transaction associated with a user is initiated at a server at a transaction site.

In some embodiments, a first authentication step is conducted based on a correlation between the location of the server and the location of a user device associated with the user. If the authentication succeeds then there is no need for verification with the user through the user device. However, if the authentication fails then verification is made via a push notification, a phone call, or 2-way SMS, for example, requesting user input at the user device.

If further verification is required, authentication is also made using other characteristics such as speed, acceleration, and key login in speed for example. Furthermore, communications are made with a detection unit so that it can retrieve information from the database to identify whether the transaction is potentially fraudulent.

After the above verifications, if it is deemed that the user needs to be informed, a verification message is sent to a user device associated with the user, where the user is prompted to enter user credentials and validate the transaction, reject/decline the transaction, and/or flag the transaction as fraudulent or non-fraudulent. If the transaction is flagged fraudulent, an entry is made into the database of the appropriate fraud prevention system. As mentioned previously, in some embodiments, this flagged information is verified by analyzing social media analytics such as web forums, posts, social media sites, and other private/public databases to determine reliability.

As discussed above, the database in the fraud prevention system is used to look at historical transactions of all users to check for potential fraud, and then appropriate users are notified/alerted of potential fraudulent transactions on their account, via rich push notifications, email, phone, or SMS for example.

Figure 8:
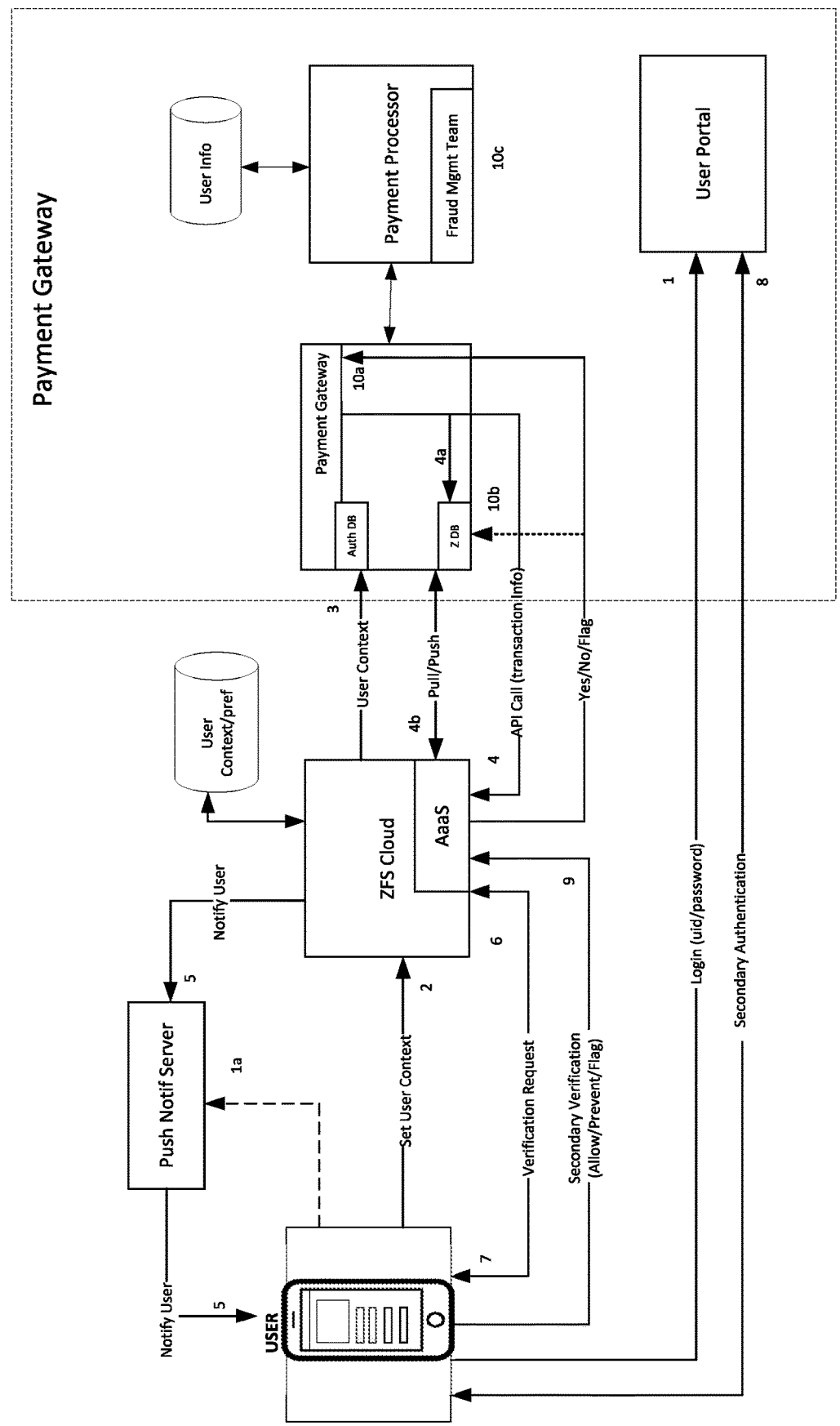
FIG. 8 represents a flow diagram of another implementation of the fraud detection unit method.

An example of the implementation of the fraud detection system and resolution management system can be seen in FIG. 8. In this example, a third party payment gateway is integrated with the system to enable credit processing. In some embodiments, the payment gateway may be part of the fraud verification and resolution management system.

The user logins in (1) to the system (payment gateway) using a mobile device as their device (la) and registers with the system server (Fraud Detection Unit). The user sets their preferences regarding notifications and financial security with the system server (2).

These settings are passed on to the payment gateway authentication database of the payment gateway (3).

If a transaction is flagged by the payment gateway, a notification is sent to the Fraud Detection Unit utilizing an application programming interface (4). In some embodiments, the flag is stored on the payment gateway database (4a) prior to the flag being pushed to the fraud detection unit (4b).

The fraud detection unit, receiving the flag from the payment gateway, pushes the flag to the user via rich push notifications (5). The user device receives the notification (6) and the transaction information is downloaded or viewed on the user device (7).

The user may input a secondary password to authenticate (8), and the corresponding user selected action (e.g., allow/prevent/flag) is pushed to the fraud detection unit. This response is sent from the Fraud Detection Unit to the payment gateway (10a) and recorded in the database within the payment gateway (10b).

In some embodiments, a rich push notification may be sent to a user device after checking database information for various transaction information related to one or more devices. Rich push notifications include, but not limited to, an email, an SMS, instant message, VOIP call, or a phone call (automated or conventional), and other medium of electronic messaging.

For example, these alerts may be used to alert a first user device of a suspicious second user device when a first user device enters the proximity of the second user device. This may include a customer walking into a merchant's store where the customer receives an instant message on their mobile device informing the customer that the current merchant store has a transaction history including a high rate of invalid authentication.

In another example, a merchant may be alerted of a potential customer having a high level of invalid authentication with respect to a specific credit card.

In some embodiments, the alert is proximity based by a pre-determined threshold when the first user device meets the threshold relative to a second user device.

In some embodiments, the alert is given once the transaction history in the database reaches a pre-determined threshold. For example, if the number of invalid authentications for a merchant device totals 10 per month, an alert is sent to a number of user devices on the system which frequently conduct transactions at the company, utilizing the merchant device.

It is obvious that the foregoing embodiments of the invention are examples and can be varied in many ways. Such present or future variations are not to be regarded as a departure from the spirit and scope of the invention, and all such modifications as would be obvious to one skilled in the art are intended to be included within the scope of the following claims.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine.

Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method for authenticating a transaction initiated through a mobile computing device of a user, the method comprising:
    providing a graphic user interface to receive credential input, the graphic user interface being operable to provide a feedback for a user in response to a user interaction;
    enabling a user to select a setting from a plurality of settings, the plurality of settings including one or more obfuscation settings that make the feedback hidden from an observer other than the user;
    in response to a transaction being initiated by or for the user to utilize a mobile wallet of the mobile computing device, enabling the user to provide the credential input on the graphic user interface, the graphic user interface being operable to provide the feedback for the user;
    receiving, on the mobile computing device, by the user touching an area of a display screen where the graphic user interface is provided, a sequence of entries that correspond to the credential input;
    determining, using sensor data from multiple types of sensors of the mobile computing device, a context of the mobile computing device;
    based on the one or more obfuscation settings and the determined context, obfuscating, from a person other than the user viewing the display screen, the feedback for the user touching the area on the display screen;
    authenticating the user based at least in part on the credential input; and
    authorizing use of the mobile wallet for the transaction in response to authenticating the user.

2. The method of claim 1, wherein the method further comprises:
    in response to receiving each entry of the sequence, providing a feedback on the mobile computing device that is based on the selected setting of the plurality of settings, the setting causing the mobile computing device to obfuscate a pattern formed by the user when providing the sequence of entries.

3. The method of claim 2, wherein the one or more obfuscation settings each coincide with a type of feedback provided to the user in response to the user interacting with the graphical user interface to provide each entry of the sequence.

4. The method of claim 1, wherein authorizing use of the transaction includes transmitting, from a second device, an authorization of the transaction.

5. The method of claim 4, wherein the second device includes a near-field communication (NFC) interface, and wherein the authorization is transmitted across the NFC interface.

6. The method of claim 4, wherein the second device includes a wireless communication interface, and wherein the authorization is transmitted across the wireless communication interface.

7. The method of claim 4, wherein the mobile computing device and the second device are both part of a same device.

8. The method of claim 4, wherein the mobile computing device and the second device are different devices.

9. The method of claim 4, wherein authenticating the user is further based at least in part on (i) obtaining mobile computing device information that identifies a location of the mobile computing device, (ii) obtaining second device information that identifies a location of the second device, and (iii) comparing the location of the mobile computing device with the location of the second device.

10. The method of claim 1, wherein authenticating the user is further based at least in part on implicitly authenticating the user from behavioral analytics performed on data obtained by monitoring one or more characteristics of the user utilizing the mobile computing device.

11. A computing device comprising:
    one or more processors;
    a memory to store a set of instructions;
    wherein the one or more processors access the set of instructions to authenticate a transaction in real-time, by performing operations comprising:
    providing a graphic user interface to receive credential input, the graphic user interface being operable to provide a feedback for a user in response to a user interaction;
    enabling a user to select a setting from a plurality of settings, the plurality of settings including one or more obfuscation settings that make the feedback hidden from an observer other than the user;
    in response to a transaction being initiated by or for the user to utilize a mobile wallet of the computing device, enabling the user to provide the credential input on the graphic user interface, the graphic user interface being operable to provide the feedback for the user;
    receiving, on the computing device, by the user touching an area of a display screen where the graphic user interface is provided, a sequence of entries that correspond to the credential input;
    determining, using sensor data from multiple types of sensors of the computing device, a context of the computing device;
    based on the one or more obfuscation settings and the determined context, obfuscating, from a person other than the user viewing the display screen, the feedback of the user touching the area on the display screen;

authenticating the user based at least in part on the credential input; and authorizing use of the mobile wallet for the transaction in response to authenticating the user.

12. The computing device of claim 11, wherein the operations further comprise:

in response to receiving each entry of the sequence, providing a feedback on the computing device that is based on the selected setting of the plurality of settings, the selected setting causing the computing device to obfuscate a pattern formed by the user when providing the sequence of entries.

13. The computing device of claim 12, wherein the one or more obfuscation settings each coincide with a type of feedback provided to the user in response to the user interacting with the graphical user interface to provide each entry of the sequence.

14. The computing device of claim 11, wherein authorizing use of the transaction includes transmitting an authorization of the transaction.

15. The computing device of claim 14, wherein the authorization is transmitted over a wireless communication interface.

16. The computing device of claim 14, wherein the authorization is transmitted over a near-field communication (NFC) interface.

17. The computing device of claim 11, wherein authenticating the user is further based at least in part on implicitly authenticating the user from behavioral analytics performed on data obtained by monitoring one or more characteristics of the user utilizing the computing device.

18. A non-transitory machine-readable medium that stores instructions executable by one or more processors to cause the one or more processors to perform operations that comprise:

providing a graphic user interface to receive credential input, the graphic user interface being operable to provide a feedback for a user in response to a user interaction;

enabling a user to select a setting from a plurality of settings, the plurality of settings including one or more obfuscation settings that make the feedback hidden from an observer other than the user;

in response to a transaction being initiated by or for the user to utilize a mobile wallet of a computing device, enabling the user to provide the credential input on the graphic user interface, the graphic user interface being operable to provide the feedback for the user;

receiving, on the computing device, by the user touching an area of a display screen where the graphic user interface is provided, a sequence of entries that correspond to the credential input;

determining, using sensor data from multiple types of sensors of the computing device, a context of the computing device;

based on the one or more obfuscation settings and the determined context obfuscating, from a person other than the user viewing the display screen, the feedback for the user touching the area on the display screen;

authenticating the user based at least in part on the credential input; and authorizing use of the mobile wallet for the transaction in response to authenticating the user.

19. The non-transitory machine-readable medium of claim 18, wherein the operations further comprise:

in response to receiving each entry of the sequence, providing a feedback on the computing device that is based on the selected setting of the plurality of settings, the setting causing the computing device to obfuscate a pattern formed by the user when providing the sequence of entries.

20. The non-transitory machine-readable medium of claim 19, wherein the one or more obfuscation settings each coincide with a type of feedback provided to the user in response to the user interacting with the graphical user interface to provide each entry of the sequence.

21. The method of claim 1, wherein determining the context of the mobile computing device includes using sensor data from at least one of an accelerometer, a gyroscope, a camera, or a Global Positioning System (GPS) component.

22. The method of claim 21, wherein determining the context includes determining how the user is holding the mobile computing using the accelerometer of the mobile computing device.

23. The computer device of claim 11, wherein determining the context of the computer device includes using sensor data from at least one of an accelerometer, a gyroscope, a camera, or a Global Positioning System (GPS) component.

24. The computer device of claim 23, wherein determining the context includes determining how the user is holding the mobile computing using the accelerometer of the mobile computing device.

25. The non-transitory machine-readable medium of claim 18, wherein determining the context of the computing device includes using sensor data from at least one of an accelerometer, a gyroscope, a camera, or a Global Positioning System (GPS) component.

26. The non-transitory machine-readable medium of claim 25, wherein determining the context includes determining how the user is holding the mobile computing using the accelerometer of the computing device.

* * * * *